United States Patent
Shutou et al.

(10) Patent No.: US 7,800,721 B2
(45) Date of Patent: Sep. 21, 2010

(54) LIQUID CRYSTAL PANEL AND LIQUID CRYSTAL DISPLAY APPARATUS USING THE SAME

(75) Inventors: Shunsuke Shutou, Osaka (JP); Naoki Takahashi, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 465 days.

(21) Appl. No.: 11/993,582

(22) PCT Filed: Jun. 16, 2006

(86) PCT No.: PCT/JP2006/312126

§ 371 (c)(1),
(2), (4) Date: Dec. 21, 2007

(87) PCT Pub. No.: WO2006/137338

PCT Pub. Date: Dec. 28, 2006

(65) Prior Publication Data

US 2010/0045909 A1 Feb. 25, 2010

(30) Foreign Application Priority Data

Jun. 22, 2005 (JP) .............................. 2005-181748

(51) Int. Cl.
*G02F 1/1335* (2006.01)

(52) U.S. Cl. ....................... 349/118; 349/119

(58) Field of Classification Search .......... 349/117–121
See application file for complete search history.

(56) References Cited

U.S. PATENT DOCUMENTS 6,281,952 B1   8/2001   Okamoto et al.
6,628,359 B1   9/2003   Terashita et al.
7,319,500 B2 * 1/2008   Yoshida et al. ................. 349/96
7,330,232 B2 * 2/2008   Jeon et al. ..................... 349/119
7,397,524 B2 * 7/2008   Jeon et al. ..................... 349/119

(Continued)

FOREIGN PATENT DOCUMENTS

JP   11-242226 A   9/1999

(Continued)

OTHER PUBLICATIONS

International Search Report of PCT/JP2006/312126, date of mailing Jul. 25, 2006.

*Primary Examiner*—Sarah Song
(74) *Attorney, Agent, or Firm*—Westerman, Hattori, Daniels & Adrian, LLP

(57) ABSTRACT

There is provided a liquid crystal panel having excellent balance between contrast and viewing angle characteristics.

A liquid crystal panel according to an embodiment of the present invention includes: a first polarizer; a first optical compensation layer containing a resin having an absolute value of photoelastic coefficient of $2 \times 10^{-11}$ m$^2$/N or less, and having a relationship of nx>ny=nz; a second optical compensation layer having a relationship of nx=ny>nz; a liquid crystal cell; a third optical compensation layer containing a resin having an absolute value of photoelastic coefficient of $2 \times 10^{-11}$ m$^2$/N or less, and having a relationship of nx>ny=nz; and a second polarizer, in the stated order forward a viewer side, wherein the sum $\Sigma Rth_{1-n}$ of the thickness direction retardation of all the optical compensation layers and the thickness direction retardation $Rth_c$ of the liquid crystal cell satisfy the following expression (1):

$$-50 \text{ nm} < (\Sigma Rth_{1-n} - Rth_c) < 150 \text{ nm} \qquad (1).$$

8 Claims, 6 Drawing Sheets

U.S. PATENT DOCUMENTS

| | | |
|---|---|---|
| 2001/0007487 A1 | 7/2001 | Yoon et al. |
| 2001/0030726 A1 | 10/2001 | Yoshida et al. |
| 2001/0048497 A1 | 12/2001 | Miyachi et al. |
| 2003/0169391 A1 | 9/2003 | Uchida et al. |
| 2004/0135949 A1* | 7/2004 | Maeda ........................ 349/119 |
| 2005/0099562 A1 | 5/2005 | Nishikouji et al. |
| 2005/0190326 A1 | 9/2005 | Jeon et al. |
| 2006/0036033 A1 | 2/2006 | Toyoshima et al. |
| 2006/0061697 A1 | 3/2006 | Kawai et al. |

FOREIGN PATENT DOCUMENTS

| | | |
|---|---|---|
| JP | 2001-311948 A | 11/2001 |
| JP | 2002-55342 A | 2/2002 |
| JP | 2002-182036 A | 6/2002 |
| JP | 2002-311243 A | 10/2002 |
| JP | 2003-262869 A | 9/2003 |
| JP | 2004-151640 A | 5/2004 |
| JP | 2004-157300 A | 6/2004 |
| JP | 2004-206065 A | 7/2004 |
| JP | 2004-246339 A | 9/2004 |
| JP | 2004-339406 A | 12/2004 |
| JP | 2005-31557 A | 2/2005 |
| JP | 2005-70771 A | 3/2005 |
| JP | 2005-91900 A | 4/2005 |
| JP | 2005-181368 A | 7/2005 |
| TW | 504590 | 10/2002 |
| WO | 2004/035688 A1 | 4/2004 |

* cited by examiner

LIQUID CRYSTAL PANEL AND LIQUID CRYSTAL DISPLAY APPARATUS USING THE SAME

TECHNICAL FIELD

The present invention relates to a liquid crystal panel, and to a liquid crystal display apparatus using the same. In particular, the present invention relates to a liquid crystal panel having excellent balance between contrast and viewing angle characteristics, and to a liquid crystal display apparatus using the same.

BACKGROUND ART

There is proposed a semi-transmissive reflective liquid crystal display apparatus as a liquid crystal display apparatus of VA mode, in addition to a transmissive liquid crystal display apparatus and a reflective liquid crystal display apparatus (see Patent documents 1 and 2, for example). The semi-transmissive reflective liquid crystal display apparatus utilizes outside light in the same manner as in the reflective liquid crystal display apparatus in a bright place, and allows visualization of display with an internal light source such as backlight in a dark place. That is, the semi-transmissive reflective liquid crystal display apparatus employs a display system combining reflective mode and transmissive mode, and switches display mode to reflective mode or transmissive mode in accordance with brightness of its environment. As a result, the semi-transmissive reflective liquid crystal display apparatus can provide a clear display even in a dark environment while reducing power consumption, and thus is suitably used for a display part of a portable device.

A specific example of such a semi-transmissive reflective liquid crystal display apparatus is a liquid crystal display apparatus including on an inner side of a lower substrate a reflective film which has a window part for light transmission formed on a metal film of aluminum or the like and which serves as a semi-transmissive reflecting plate. In a liquid crystal display apparatus of reflective mode, outside light entering from an upper substrate side passes through a liquid crystal layer, reflects on a reflective film on an inner side of the lower substrate, passes through the liquid crystal layer again, and exits from the upper substrate side, to thereby contribute in display. Meanwhile, in a liquid crystal display apparatus of transmissive mode, light from backlight entering from the lower substrate side passes through the window part of the reflective film and through the liquid crystal layer, and exits from the upper substrate side, to thereby contribute in display. Thus, of a reflective film-formed region, a region having the window part formed becomes a transmissive display region, and the remaining region becomes a reflective display region.

However, in a conventional reflective or semi-transmissive liquid crystal display apparatus of VA mode, problems of light leak in black display and reduction in contrast have not been solved for a long period of time.

Patent document 1: JP 11-242226 A
Patent document 2: JP 2001-209065 A

DISCLOSURE OF THE INVENTION

Problems to be Solved by the Invention

The present invention has been made in view of solving the conventional problems described above, and an object of the present invention is therefore to provide a liquid crystal panel having excellent balance between contrast and viewing angle characteristics, and a liquid crystal display apparatus using the same.

Means for Solving the Problems

A liquid crystal panel according to an embodiment of the present invention includes a first polarizer; a first optical compensation layer containing a resin having an absolute value of photoelastic coefficient of $2\times10^{-11}$ m$^2$/N or less, and having a relationship of nx>ny=nz; a second optical compensation layer having a relationship of nx=ny>nz; a liquid crystal cell; a third optical compensation layer containing a resin having an absolute value of photoelastic coefficient of $2\times10^{-11}$ m$^2$/N or less, and having a relationship of nx>ny=nz; and a second polarizer, in the stated order forward a viewer side. The sum $\Sigma Rth_{1-n}$ of the thickness direction retardation of all the optical compensation layers and the thickness direction retardation $Rth_c$ of the liquid crystal cell satisfy the following expression (1):

$$-50 \text{ nm} < (\Sigma Rth_{1-n} - Rth_c) < 150 \text{ nm} \qquad (1).$$

In one embodiment of the invention, the liquid crystal panel further includes a fourth optical compensation layer having a relationship of nx=ny>nz and being arranged between the liquid crystal cell and the third optical compensation layer. In another embodiment of the invention, the liquid crystal cell employs a VA mode.

In still another embodiment of the invention, the second optical compensation layer is formed of a cholesteric alignment fixed layer having a selective reflection wavelength region of 350 nm or less. In a preferred embodiment, the second optical compensation layer has a thickness of 1 to 5 μm. Alternatively, the second optical compensation layer includes a layer formed of a film having a relationship of nx=ny>nz and containing a resin having an absolute value of photoelastic coefficient of $2\times10^{-11}$ m$^2$/N or less and a cholesteric alignment fixed layer having a selective reflection wavelength region of 350 nm or less. In a preferred embodiment, the second optical compensation layer has a thickness of 1 to 50 μm.

According to another aspect of the present invention, a liquid crystal display apparatus is provided. The liquid crystal display apparatus includes the above-described liquid crystal panel.

Effect of the Invention

As described above, according to the present invention, a liquid crystal panel having excellent balance between contrast and viewing angle characteristics can be obtained by optimizing the thickness direction retardation relationship between the liquid crystal cell and all of the optical compensation layers in a liquid crystal panel including a liquid crystal cell and at least one optical compensation layers.

DESCRIPTION OF REFERENCE NUMERALS

Figure 1A:
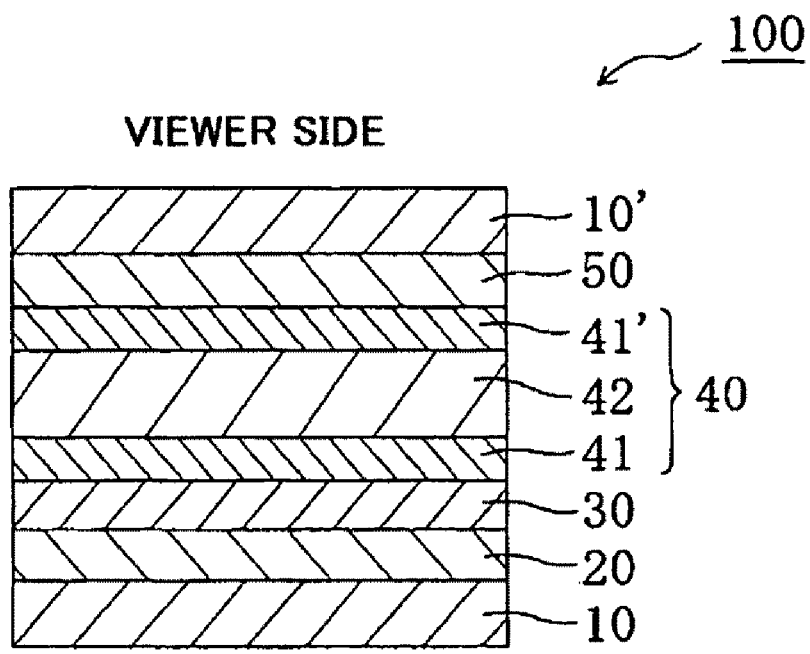
FIGS. 1(a) and 1(b) Schematic sectional views of a liquid crystal panel according to a preferred embodiment of the present invention.

100 liquid crystal panel
10, 10' polarizer
20 first optical compensation layer
30 second optical compensation layer
40 liquid crystal cell
41, 41' substrate
42 liquid crystal layer
50 third optical compensation layer
60 fourth optical compensation layer

BEST MODE FOR CARRYING OUT THE INVENTION

Definitions of Terms and Symbols

Definitions of terms and symbols in the specification of the present invention are described below.

(1) The symbol "nx" refers to a refractive index in a direction providing a maximum in-plane refractive index (that is, a slow axis direction), and the symbol "ny" refers to a refractive index in a direction perpendicular to the slow axis in the same plane (that is, a fast axis direction). The symbol "nz" refers to a refractive index in a thickness direction. Further, the expression "nx=ny", for example, not only refers to the case where nx and ny are exactly equal but also includes the case where nx and ny are substantially equal. In the specification of the present invention, the phrase "substantially equal" includes the case where nx and ny differ within a range providing no effects on overall optical properties of a liquid crystal panel in practical use.

(2) The term "in-plane retardation Re" refers to an in-plane retardation value of a film (layer) measured at 23° C. by using light of a wavelength of 590 nm. Re can be determined from an equation Re=(nx−ny)×d, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wavelength of 590 nm. Rth can be determined from an equation Rth={(nx+ny)/2−nz}×d, where nx, ny and nz represent refractive indices of a film (layer) at a wavelength of 590 nm in a slow axis direction, a fast axis direction and a thickness direction, respectively, and d (nm) represents a thickness of the film (layer).

(4) The subscript "1" attached to a term or symbol described in the specification of the present invention represents a first optical compensation layer. The subscript "2" attached to a term or symbol described in the specification of the present invention represents a second optical compensation layer. The subscript "n" attached to a term or symbol described in the specification of the present invention represents an n-th optical compensation layer. The subscript "c" attached to a term or symbol described in the specification of the present invention represents a liquid crystal cell.

(5) $\Sigma Rth_{1-n}$ in the above expression (1) represents a sum of the thickness direction retardation of the first optical compensation layer to the n-th optical compensation layer. Therefore, in the case where the liquid crystal panel of the present invention includes three optical compensation layers, $\Sigma Rth_{1-n}$ is represented by the following equation:

$$\Sigma Rth_{1-n} = Rth_1 + Rth_2 + Rth_3$$

where $Rth_1$, $Rth_2$ and $Rth_3$ represent a thickness direction retardation of the first optical compensation layer, the second optical compensation layer and the third optical compensation layer, respectively. In the case where the liquid crystal panel of the present invention further includes the fourth optical compensation layer, $\Sigma Rth_{1-n}$ is represented by the following equation:

$$\Sigma Rth_{1-n} = Rth_1 + Rth_2 + Rth_3 + Rth_4$$

(6) The term "cholesteric alignment fixed layer" refers to a layer in which: molecules forming the layer form a helical structure; a helical axis of the helical structure is aligned substantially perpendicular to a plane direction; and an alignment state is fixed. Thus, the term "cholesteric alignment fixed layer" not only refers to the case where liquid crystal compound exhibits a cholesteric liquid crystal phase, but also includes the case where a non-liquid crystal compound has a pseudo structure of a cholesteric liquid crystal phase. For example, the "cholesteric alignment fixed layer" may be formed by: providing torsion to a liquid crystal material exhibiting a liquid crystal phase with a chiral agent for alignment into a cholesteric structure (helical structure); subjecting the liquid crystal material to polymerization treatment or crosslinking treatment for fixing the alignment (cholesteric structure) of the liquid crystal material.

(7) The phrase "selective reflection wavelength region of 350 nm or less" indicates that a center wavelength λ of a selective reflection wavelength region is 350 nm or less. For example, in the case where the cholesteric alignment fixed layer is formed by using a liquid crystal monomer, the center wavelength λ of the selective reflection wavelength region may be represented by the following equation.

$$\lambda = n \times P$$

In the equation, n represents an average refractive index of the liquid crystal monomer, and P represents a helical pitch (nm) of the cholesteric alignment fixed layer. The average refractive index n is represented by $(n_o + n_e)/2$, and is generally within a range of 1.45 to 1.65. $n_o$ represents an ordinary refractive index of the liquid crystal monomer, and $n_e$ represents an extraordinary refractive index of the liquid crystal monomer.

(8) The term "chiral agent" refers to a compound having a function of aligning the liquid crystal material (nematic liquid crystals, for example) into a cholesteric structure.

(9) The term "torsional force" refers to ability of the chiral agent to provide torsion to the liquid crystal material and to align the liquid crystal material into a cholesteric structure (helical structure). In general, the torsional force may be represented by the following equation.

Torsional force=$1/(P \times W)$

As described above, P represents a helical pitch (nm) of the cholesteric alignment fixed layer. W represents a weight ratio of the chiral agent. The weight ratio W of the chiral agent may be represented by $W=[X/(X+Y)] \times 100$. X represents a weight of the chiral agent, and Y represents a weight of the liquid crystal material.

A. Overall Structure of Liquid Crystal Panel

Figure 1B:
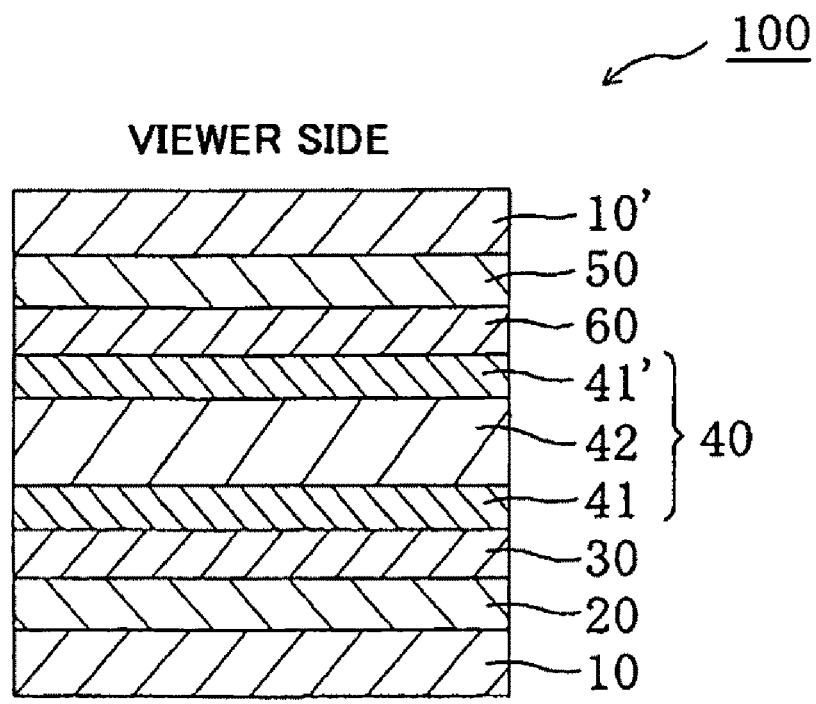

A liquid crystal panel according to the present invention may be preferably applicable to any of a transmissive liquid crystal display apparatus, a reflective liquid crystal display apparatus and a semi-transmissive reflective liquid crystal display apparatus. FIG. 1(a) is a schematic sectional view of a liquid crystal panel according to a preferred embodiment of the present invention. The liquid crystal panel is provided with: a first polarizer 10, a first optical compensation layer 20, a second optical compensation layer 30, a liquid crystal cell 40, a third optical compensation layer 50, and a second polarizer 10' in this order forward a viewer side. The first optical compensation layer 20 contains a resin having an absolute value of photoelastic coefficient of $2 \times 10^{-11}$ m$^2$/N or less, and has a relationship of nx>ny=nz. The second optical compensation layer 30 has a relationship of nx=ny>nz. The third optical compensation layer 50 contains a resin having an absolute value of photoelastic coefficient of $2 \times 10^{-11}$ m$^2$/N or less, and has a relationship of nx>ny=nz. FIG. 1(b) is a schematic sectional view of a liquid crystal panel according to another embodiment of the present invention. As shown in FIG. 1(b), a liquid crystal panel of the present invention may further include a fourth optical compensation layer 60 between the liquid crystal cell 40 and the third optical compensation layer 50, as required. The fourth optical compensation layer 60 has a relationship of nx=ny>nz. In the present invention, the sum $\Sigma Rth_i$ of the thickness direction retardation of all the optical compensation layers and the thickness direction retardation $Rth_c$ of the liquid crystal cell satisfy the following expression:

$$-50 \text{ nm} < (\Sigma Rth_{1-n} - Rth_c) < 150 \text{ nm} \quad (1)$$

For practical use, any appropriate protective film (not shown) may be arranged on the first and second polarizers 10 and 10' on a side having no optical compensation layer formed. Further, as required, a protective film may be provided between the polarizer and the optical compensation layer.

The first and second polarizers 10 and 10' are typically arranged such that absorption axes of the respective polarizers are perpendicular to each other. The first optical compensation layer 20 is arranged such that its slow axis forms an angle of preferably −37° to −52°, more preferably −40° to −50°, especially preferably −42° to −48°, and most preferably approximately −45° with respect to an absorption axis of the first polarizer 10. The third optical compensation layer 50 is arranged such that its slow axis forms an angle of preferably 37° to 52°, more preferably 40° to 50°, especially preferably 42° to 48°, and most preferably approximately 45° with respect to the absorption axis of the first polarizer 10. Preferably, the third optical compensation layer 50 is arranged such that its slow axis is substantially perpendicular to the slow axis of the first optical compensation layer 20. By arranging the respective polarizers and the respective optical compensation layers with the above-described specific relationship, a liquid crystal panel having excellent balance between contrast and viewing angle characteristics can be obtained. It should be noted that: since the second optical compensation layer 30 basically does not have a slow axis, a precise arrangement of the second optical compensation layer with respect to the absorption axis of the first polarizer 10 is not required. Similarly, in the case where the fourth optical compensation layer 60 is provided, since the fourth optical compensation layer 60 basically does not have a slow axis, a precise arrangement of the fourth optical compensation layer with respect to the absorption axis of the first polarizer 10 is not required.

As shown in the above expression (1), the difference between the sum $\Sigma Rth_{1-n}$ of the thickness direction retardation of all the optical compensation layers and the thickness direction retardation $Rth_c$ of the liquid crystal cell is more than −50 nm and less than 150 nm. By optimizing the relationship between the thickness direction retardation of the liquid crystal cell and that of the optical compensation layers, a liquid crystal panel having remarkably excellent balance between contrast and viewing angle characteristics can be obtained. Especially, by setting the difference between the sum of the thickness direction retardation of all the optical compensation layers and the thickness direction retardation of the liquid crystal cell in the above-mentioned range, a liquid crystal panel in which high contrast is obtained over a wide range of viewing angle and the direction where high contrast is obtained is not largely shifted from the frontal direction (in other words, viewer-friendly) can be obtained. In one embodiment, the difference between the sum of the thickness direction retardation of all the optical compensation layers and the thickness direction retardation of the liquid crystal cell is preferably −40 nm to 40 nm, and more preferably −30 nm to 20 nm. The difference in such range can provide high contrast in an extremely wide range of viewing angle. In another embodiment, the difference between the sum of the thickness direction retardation of all the optical compensation layers and the thickness direction retardation of the liquid crystal cell is preferably 40 nm to 140 nm, and more preferably 50 nm to 130 nm. The difference in such range can provide high contrast substantially in the frontal direction, which results in a remarkably viewer-friendly liquid crystal panel.

The liquid crystal cell 40 includes: a pair of substrates (typically, glass substrates) 41 and 41'; and a liquid crystal layer 42 as a display medium arranged between the substrates. One substrate (active matrix substrate) 41 is provided with: a switching element (typically, TFT) for controlling electrooptic characteristics of liquid crystal; and a scanning line for providing a gate signal to the switching element and a signal line for providing a source signal thereto (the element and the lines not shown). The other glass substrate (color filter substrate) 41' is provided with a color filter (not shown). The color filter may be provided on the active matrix substrate 41. A space (cell gap) between the substrates 41 and 41' is controlled by a spacer (not shown). An alignment film (not shown) made of, for example, polyimide is provided on a side of each of the substrates 41 and 41' in contact with the liquid crystal layer 42.

A drive mode of the liquid crystal cell 40 may employ any suitable drive modes as long as the effects of the present invention can be provided. Specific examples of the drive mode include a super twisted nematic (STN) mode, a twisted nematic (TN) mode, an in-plane switching (IPS) mode, a vertical aligned (VA) mode, an optically compensated birefringence (OCB) mode, a hybrid aligned nematic (HAN) mode, and an electrically controlled birefringence (ECB)

mode. Of those, a VA mode is preferred because a liquid crystal panel having excellent balance between contrast and viewing angle characteristics can be obtained by combining a VA mode liquid crystal cell with the optical compensation layers to be used in the present invention.

Figure 2A:
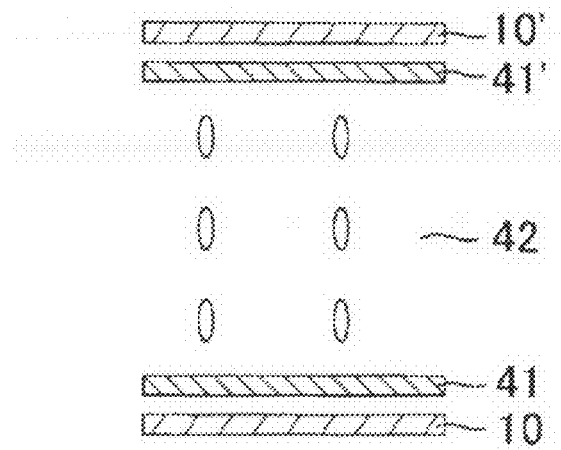
FIG. 2(a) and 2(b) Schematic sectional views illustrating an alignment state of liquid crystal molecules of a liquid crystal layer in a case where a liquid crystal panel of the present invention employs a VA mode liquid crystal cell.
Figure 2B:
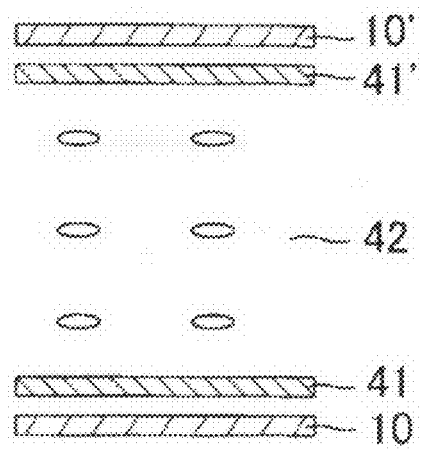

FIGS. 2(a) and 2(b) are each a schematic sectional view illustrating an alignment state of liquid crystal molecules in a VA mode. As shown in FIG. 2(a), liquid crystal molecules are aligned vertically to the substrates 41 and 41' without application of a voltage. Such vertical alignment is realized by arranging nematic liquid crystal having negative dielectric anisotropy between the substrates each having a vertical alignment film formed thereon (not shown). When light (specifically, linear polarized light which passed through the polarizer 10) enters the liquid crystal layer 42 in such a state from a surface of one substrate 41, the incident light advances along a longitudinal direction of the vertically aligned liquid crystal molecules. No birefringence occurs in the longitudinal direction of the liquid crystal molecules, and thus the incident light advances without changing a polarization direction and is absorbed by the polarizer 10' having an absorption axis perpendicular to that of the polarizer 10. In this way, a dark state is displayed without application of a voltage (normally black mode). As shown in FIG. 2(b), longitudinal axes of the liquid crystal molecules align parallel to the substrate surfaces when a voltage is applied between the electrodes. The liquid crystal molecules exhibit birefringence with linear polarized light entering the liquid crystal layer 42 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the polarizer 10', and a bright state is displayed. Upon termination of voltage application, the display is returned to a dark state by an alignment restraining force. An applied voltage is changed to control inclination of the liquid crystal molecules, so as to change an intensity of light transmission from the polarizer 10'. As a result, display of gradation can be realized.

The thickness direction retardation $Rth_c$ of the liquid crystal cell is preferably 240 to 400 nm, more preferably 270 to 370 nm, and most preferably 300 to 340 nm. By setting the thickness direction retardation of the liquid crystal cell in the above range and by using such liquid crystal cell in combination with the optical compensation layers as described later, a liquid crystal panel having excellent balance between contrast and viewing angle characteristics can be obtained.

B. First Optical Compensation Layer

As described above, the first optical compensation layer 20 contains a resin having an absolute value of photoelastic coefficient of $2 \times 10^{-11}$ m$^2$/N or less, and has a refractive index profile of nx>ny=nz. The in-plane retardation $Re_1$ of the first optical compensation layer is preferably 100 to 180 nm, more preferably 110 to 160 nm, and most preferably 120 to 140 nm. The thickness direction retardation $Rth_1$ of the first optical compensation layer is preferably 45 to 85 nm, more preferably 55 to 75 nm, and most preferably 60 to 70 nm. The thickness of the first optical compensation layer is set to provide desired in-plane retardation and thickness direction retardation. Specifically, the thickness of the first optical compensation layer is preferably 25 to 55 µm, more preferably 30 to 40 µm, and most preferably 33 to 37 µm.

The first optical compensation layer 20 contains a resin having an absolute value of photoelastic coefficient of $2 \times 10^{-11}$ m$^2$/N or less, preferably $2.0 \times 10^{-13}$ to $1.0 \times 10^{-11}$ m$^2$/N and more preferably $1.0 \times 10^{-12}$ to $1.0 \times 10^{-11}$ m$^2$/N. An absolute value of photoelastic coefficient within the above ranges hardly causes change in retardation due to shrinkage stress under heating. Thus, the first optical compensation layer may be formed by using a resin having such an absolute value of photoelastic coefficient, to thereby favorably prevent uneven display due to heat of a liquid crystal panel to be obtained.

Typical examples of the resin capable of satisfying such a photoelastic coefficient include a cyclic olefin-based resin and a cellulose-based resin. The cyclic olefin-based resin is particularly preferred. The cyclic olefin-based resin is a general term for a resin prepared through polymerization of a cyclic olefin as a monomer, and examples thereof include resins described in JP 1-240517 A, JP 3-14882 A, JP 3-122137 A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin includes a norbornene-based monomer.

Examples of the norbornene-based monomer include: norbornene, its alkyl substitution and/or alkylidene substitution such as 5-methyl-2-norbornene, 5-dimethyl-2-norbornene, 5-ethyl-2-norbornene, 5-butyl-2-norbornene, 5-ethylidene-2-norbornene, and their products each substituted by a polar group such as halogen; dicyclopentadiene and 2,3-dihydrodicyclopentadiene; dimethano octahydronaphtalene, its alkyl substitution and/or alkylidene substitution, and their products each substituted by a polar group such as halogen, for example, 6-methyl-1,4:5,8-dimethano-1,4,4a,5,6,7,8,8a-octahydronaphtalene, 6-ethyl-1,4:5,8-dimethano-1,4,4a,5,6,7,8,8a-octahydronaphtalene, 6-ethylidene-1,4:5,8-dimethano-1,4,4a,5,6,7,8,8a-octahydronaphtalene, 6-chloro-1,4:5,8-dimethano-1,4,4a,5,6,7,8,8a-octahydronaphtalene, 6-cyano-1,4:5,8-dimethano-1,4,4a,5,6,7,8,8a-octahydronaphtalene, 6-pyridyl-1,4:5,8-dimethano-1,4,4a,5,6,7,8,8a-octahydronaphtalene, and 6-methoxycarbonyl-1,4:5,8-dimethano-1,4,4a,5,6,7,8,8a-octahydronaphtalene; and a trimer of cyclopentadiene and a tetramer of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

In the present invention, other ring-opening polymerizable cycloolefins can be combined without impairing the purpose of the present invention. Specific example of such cycloolefin includes a compound having one reactive double-bond, for example, cyclopentene, cyclooctene, and 5,6-dihydrodicyclopentadiene.

The cyclic olefin-based resin has a number average molecular weight (Mn) of preferably 25,000 to 200,000, more preferably 30,000 to 100,000, and most preferably 40,000 to 80,000 measured through a gel permeation chromatography (GPC) method by using a toluene solvent. A number average molecular weight within the above ranges can provide a resin having excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance, light degradation resistance, and the like.

For the cyclic olefin-based resin, various products are commercially available. Specific examples of the resin include the trade names "ZEONEX" and "ZEONOR" each manufactured by ZEON CORPORATION, the trade name "Arton" manufactured by JSR Corporation, the trade name "TOPAS" manufactured by TICONA Corporation, and the trade name "APEL" manufactured by Mitsui Chemicals, Inc.

Any appropriate cellulose-based resin (typically an ester of cellulose and acid) may be employed as the cellulose-based resin. An ester of cellulose and fatty acid is preferred. Specific examples of such cellulose-based resin include cellulose triacetate (triacetylcellulose: TAC), cellulose diacetate, cellulose tripropionate, and cellulose dipropionate. Cellulose triacetate (triacetyl cellulose: TAC) is particularly preferred because it has low birefringence and high transmittance. In addition, many products of TAC are commercially available, and thus TAC has advantages of availability and cost.

Specific examples of commercially available products of TAC include the trade names "UV-50", "UV-80", "SH-50", "SH-80", "TD-80U", "TD-TAC", and "UZ-TAC" each manufactured by Fuji Photo Film CO., LTD., the trade name "KC series" manufactured by Konica Minolta Corporation, and the trade name "Triacetyl Cellulose 80 µm series" manufactured by Lonza Japan Corporation. Of those, "TD-80U" is preferred because of excellent transmittance and durability. In particular, "TD-80U" has excellent adaptability to a TFT-type liquid crystal display apparatus.

The first optical compensation layer 20 is preferably obtained by stretching a film formed of the cyclic olefin-based resin or the cellulose-based resin. Any appropriate forming method may be employed as a method of forming a film from the cyclic olefin-based resin or the cellulose-based resin. Specific examples thereof include a compression molding method, a transfer molding method, an injection molding method, an extrusion molding method, a blow molding method, a powder molding method, an FRP molding method, and a casting method. The extrusion molding method and the casting method are preferred because a film to be obtained may have enhanced smoothness and favorable optical uniformity. Forming conditions may appropriately be set in accordance with the composition or type of resin to be used, properties desired for the first optical compensation layer, and the like. Many film products of the cyclic olefin-based resin and the cellulose-based resin are commercially available, and the commercially available films may be subjected to the stretching treatment.

A stretch ratio of the film may vary depending on the in-plane retardation value and thickness desired for the first optical compensation layer, the type of resin to be used, the thickness of the film to be used, the stretching temperature, and the like. To be specific, the stretch ratio is preferably 1.10 to 1.50 times, more preferably 1.15 to 1.45 times, and most preferably 1.24 to 1.32 times. Stretching at such a stretch ratio may provide a first optical compensation layer having an in-plane retardation and a thickness direction retardation which may appropriately exhibit the effect of the present invention.

A stretching temperature of the film may vary depending on the in-plane retardation value and thickness desired for the first optical compensation layer, the type of resin to be used, the thickness of the film to be used, the stretch ratio, and the like. To be specific, the stretching temperature is preferably 130 to 150° C., more preferably 135 to 145° C., and most preferably 137 to 143° C. Stretching at such a stretching temperature may provide a first optical compensation layer having an in-plane retardation and a thickness direction retardation which may appropriately exhibit the effect of the present invention.

Referring to FIGS. 1(a) and 1(b), the first optical compensation layer 20 is arranged between the first polarizer 10 and the second optical compensation layer 30. Any appropriate method may be employed as a method of arranging the first optical compensation layer in accordance with the purpose. Typically, the first optical compensation layer 20 is provided with a pressure-sensitive adhesive layer (not shown) on each side, and the first optical compensation layer 20 is bonded to the first polarizer 10 and the second optical compensation layer 30. A gap between the layers is filled with the pressure-sensitive adhesive layer as described above, to thereby prevent shift in relationship among optical axes of the respective layers and abrasion among the layers causing damages when the first optical compensation layer is incorporated into a liquid crystal panel. Furthermore, reflection at the interface between the respective layers may be reduced, to thereby provide a liquid crystal panel having high contrast.

The thickness of the pressure-sensitive adhesive layer may appropriately be set in accordance with the intended use, adhesive strength, and the like. To be specific, the pressure-sensitive adhesive layer has a thickness of preferably 1 µm to 100 µm, more preferably 5 µm to 50 µm, and most preferably 10 µm to 30 µm.

Any appropriate pressure-sensitive adhesive may be employed as a pressure-sensitive adhesive forming the pressure-sensitive adhesive layer. Specific examples thereof include a solvent-type pressure-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is preferably used for exhibiting appropriate pressure-sensitive adhesive properties (wettability, cohesiveness, and adhesiveness) with respect to the polarizer and the first optical compensation layer and providing excellent optical transparency, weatherability, and heat resistance.

C. Second Optical Compensation Layer

C-1. Overall Structure of Second Optical Compensation Layer

The second optical compensation layer 30 has a relationship of nx=ny>nz and may serve as a so-called negative C plate. The second optical compensation layer has such a refractive index profile, to thereby favorably compensate birefringence of a liquid crystal layer of a liquid crystal cell employing a VA mode. As a result, a liquid crystal panel having remarkably improved viewing angle characteristics can be obtained. Since the expression "nx=ny" in the present specification not only refers to the case where nx and ny are exactly equal but also includes the case where nx and ny are substantially equal as described above, the second optical compensation layer may have an in-plane retardation and a slow axis. The in-plane retardation $Re_2$ which is practically acceptable as a negative C plate is 0 to 20 nm, preferably 0 to 10 nm, and more preferably 0 to 5 nm.

The thickness direction retardation $Rth_2$ of the second optical compensation layer 30 is preferably 130 to 340 nm. The especially preferred $Rth_2$ may vary in accordance with the purposes. For example, in the case where high contrast over a wide range of viewing angle is desired, $Rth_2$ is more preferably 130 to 240 nm, especially preferably 140 to 200 nm, and most preferably 150 to 180 nm. In the case where a viewer-friendly liquid crystal panel having high contrast both in horizontal and vertical directions is desired, $Rth_2$ is more preferably 200 to 340 nm, especially preferably 220 to 280 nm, and most preferably 230 to 250 nm.

The thickness of the second optical compensation layer for providing such a thickness direction retardation may vary depending on a material to be used and the like. For example, the second optical compensation layer has a thickness of preferably 1 to 50 μm, more preferably 1 to 20 μm, and most preferably 1 to 15 μm. In the case where the second optical compensation layer is formed of a cholesteric alignment fixed layer described below alone, the second optical compensation layer has a thickness of preferably 1 to 5 μm, more preferably 1 to 3 μm, and most preferably 1 to 2 μm. Such a thickness is smaller than the thickness (60 μm or more, for example) of the negative C plate obtained through biaxial stretching, and may greatly contribute to reduction in thickness of a liquid crystal panel. Further, the second optical compensation layer may be formed to have a very small thickness, to thereby significantly prevent uneven display due to heat. Such an optical compensation layer having a very small thickness is preferred from the viewpoints of preventing disturbance in cholesteric alignment or reduction in transmittance, selective reflection property, color protection, productivity, and the like.

The second optical compensation layer (negative C plate) used in the present invention may be formed from any appropriate material as long as the above-mentioned thickness and optical properties can be obtained. Preferably, a negative C plate having such a very small thickness is realized by forming cholesteric alignment by using a liquid crystal material and fixing the cholesteric alignment, that is, by using a cholesteric alignment fixed layer (details of a material used for forming the cholesteric alignment and a method of fixing the cholesteric alignment are described below).

Preferably, the second optical compensation layer 30 is formed of a cholesteric alignment fixed layer having a selective reflection wavelength region of 350 nm or less. An upper limit of the selective reflection wavelength region is more preferably 320 nm or less, and most preferably 300 nm or less. Meanwhile, a lower limit of the selective reflection wavelength region is preferably 100 nm or more, and more preferably 150 nm or more. In the case where the selective reflection wavelength region is more than 350 nm, the selective reflection wavelength region covers a visible light region and thus may cause a problem such as coloring or decoloring. In the case where the selective reflection wavelength region is less than 100 nm, amount of a chiral agent (described below) to be used increases excessively and thus a temperature during formation of an optical compensation layer must be controlled very accurately. As a result, a liquid crystal panel may hardly be produced.

A helical pitch in the cholesteric alignment fixed layer is preferably 0.01 to 0.25 μm, more preferably 0.03 to 0.20 μm, and most preferably 0.05 to 0.15 μm. A helical pitch of 0.01 μm or more provides sufficient alignment property, for example. A helical pitch of 0.25 μm or less allows sufficient suppression of rotary polarization in a shorter wavelength side of visible light, to thereby sufficiently prevent light leak and the like. The helical pitch may be controlled by adjusting the type (torsional force) and amount of the chiral agent as described below. The helical pitch may be adjusted, to thereby control the selective reflection wavelength region within a desired range.

Alternatively, the second optical compensation layer 30 may have a laminate structure of the cholesteric alignment fixed layer and a layer (also referred to as a plastic film layer in the specification of the present invention) having a relationship of nx=ny>nz and containing a resin having an absolute value of photoelastic coefficient of $2\times10^{-11}$ m$^2$/N or less.

Typical examples of a material capable of forming the plastic film layer (resin capable of satisfying such a photoelastic coefficient) include a cyclic olefin-based resin and a cellulose-based resin. Details of the cyclic olefin-based resin and the cellulose-based resin are as described in the above section B. A cellulose-based resin film (typically, a TAC film) is a film having a relationship of nx=ny>nz.

C-2. Liquid Crystal Composition Forming Second Optical Compensation Layer (Cholesteric Alignment Fixed Layer): Liquid Crystal Material The second optical compensation layer (cholesteric alignment fixed layer) may be formed of a liquid crystal composition. Any appropriate liquid crystal material may be used as a liquid crystal material to be included in the composition. The liquid crystal material (nematic liquid crystals) preferably has a liquid crystal phase of a nematic phase. Examples of such a liquid crystal material that may be used include a liquid crystal polymer and a liquid crystal monomer. The liquid crystal material may exhibit liquid crystallinity through a lyotropic or thermotropic mechanism. Further, liquid crystals are preferably aligned in homogeneous alignment. A content of the liquid crystal material in the liquid crystal composition is preferably 75 to 95 wt %, and more preferably 80 to 90 wt %. In the case where the content of the liquid crystal material is less than 75 wt %, the composition may not sufficiently exhibit a liquid crystal state and thus the cholesteric alignment may not be formed sufficiently. In the case where the content of the liquid crystal material is more than 95 wt %, a content of a chiral agent may be reduced to prevent sufficient torsion to be provided and thus the cholesteric alignment may not be formed sufficiently.

The liquid crystal material is preferably a liquid crystal monomer (polymerizable monomer or crosslinking monomer, for example) because an alignment state of the liquid crystal monomer can be fixed by polymerizing or crosslinking the liquid crystal monomer as described below. The alignment state may be fixed by aligning the liquid crystal monomer and then, for example, polymerizing or crosslinking the liquid crystal monomers with each other. As a result, a polymer is formed through polymerization and a three-dimensional network structure is formed through crosslinking. The polymer and the three-dimensional network structure are non-liquid crystalline. Thus, the thus-formed second optical compensation layer does not transfer into, for example, a liquid crystal phase, glass phase, or crystal phase due to temperature change unique to a liquid crystal compound. As a result, the second optical compensation layer realizes an optical compensation layer having very excellent stability and not affected by the temperature change.

Any suitable liquid crystal monomers may be employed as the liquid crystal monomer. For example, there are used polymerizable mesogenic compounds and the like described in JP 2002-533742 A (WO 00/37585), EP 358208 (U.S. Pat. No. 5,211,877), EP 66137 (U.S. Pat. No. 4,388,453), WO 93/22397, EP 0261712, DE 19504224, DE 4408171, GB 2280445, and the like. Specific examples of the polymerizable mesogenic compounds include: LC242 (trade name) available from BASF Aktiengesellschaft; E7 (trade name) available from Merck & Co., Inc.; and LC-Silicone-CC3767 (trade name) available from Wacker-Chemie GmbH.

For example, a nematic liquid crystal monomer is preferred as the liquid crystal monomer, and a specific example thereof includes a monomer represented by the below-indicated formula (1). The liquid crystal monomer may be used alone or in combination of two or more thereof.

[Chem 1]

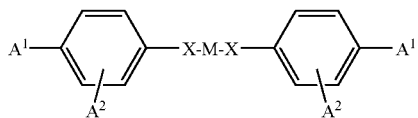
(1)

In the above formula (1), $A^1$ and $A^2$ each represent a polymerizable group, and may be the same or different from each other. One of $A^1$ and $A^2$ may represent hydrogen. Each X independently represents a single bond, —O—, —S—, —C≡N—, —O—CO—, —CO—O—, —O—CO—O—, —CO—NR—, —NR—CO—, —NR—, —O—CO—NR—, —NR—CO—O—, —CH$_2$—O—, or —NR—CO—NR—. R represents H or an alkyl group having 1 to 4 carbon atoms. M represents a mesogen group.

In the above formula (1), Xs may be the same or different from each other, but are preferably the same.

Of monomers represented by the above formula (1), each $A^2$ is preferably arranged in an ortho position with respect to $A^1$.

$A^1$ and $A^2$ are preferably each independently represented by the below-indicated formula (2), and $A^1$ and $A^2$ preferably represent the same group.

Z—X—(Sp)$_n$ (2)

In the above formula (2), Z represents a crosslinkable group, and X is the same as that defined in the above formula (1). Sp represents a spacer consisting of a substituted or unsubstituted linear or branched alkyl group having 1 to 30 carbon atoms. n represents 0 or 1. A carbon chain in Sp may be interrupted by oxygen in an ether functional group, sulfur in a thioether functional group, a non-adjacent imino group, an alkylimino group having 1 to 4 carbon atoms, or the like.

In the above formula (2), Z preferably represents any one of functional groups represented by the below-indicated formulae. In the below-indicated formulae, examples of R include a methyl group, an ethyl group, an n-propyl group, an i-propyl group, an n-butyl group, an i-butyl group, and a t-butyl group.

[Chem 2]

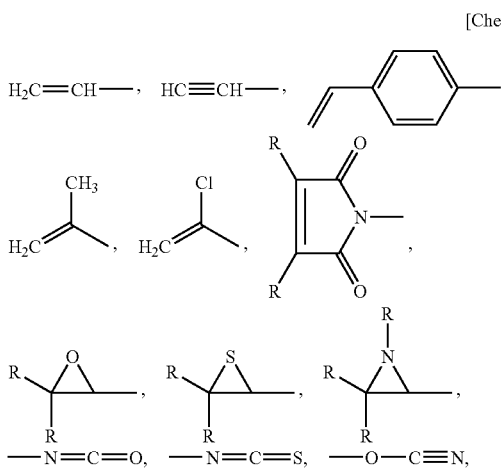

In the above formula (2), Sp preferably represents any one of structural units represented by the below-indicated formulae. In the below-indicated formulae, m preferably represents 1 to 3, and p preferably represents 1 to 12.

[Chem 3]

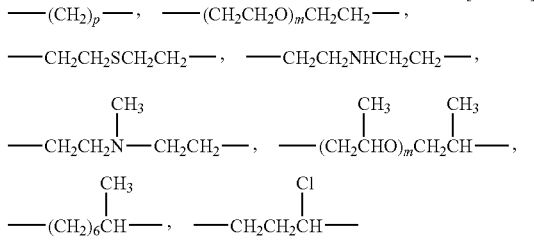

In the above formula (1), M is preferably represented by the below-indicated formula (3). In the below-indicated formula (3), X is the same as that defined in the above formula (1). Q represents a substituted or unsubstituted linear or branched alkylene group, or an aromatic hydrocarbon group, for example. Q may represent a substituted or unsubstituted linear or branched alkylene group having 1 to 12 carbon atoms, for example.

[Chem 4]

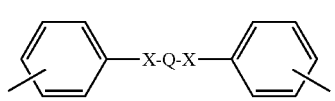
(3)

In the case where Q represents an aromatic hydrocarbon group, Q preferably represents any one of aromatic hydrocarbon groups represented by the below-indicated formulae or substituted analogues thereof.

[Chem 5]

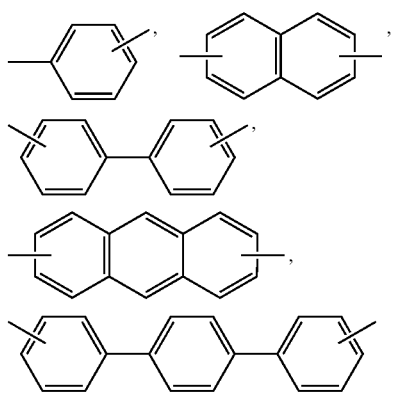

The substituted analogues of the aromatic hydrocarbon groups represented by the above formulae may each have 1 to 4 substituents per aromatic ring, or 1 to 2 substituents per aromatic ring or group. The substituents may be the same or different from each other. Examples of the substituents include: an alkyl group having 1 to 4 carbon atoms; a nitro group; a halogen group such as F, Cl, Br, or I; a phenyl group; and an alkoxy group having 1 to 4 carbon atoms.

Specific examples of the liquid crystal monomer include monomers represented by the following formulae (4) to (19).

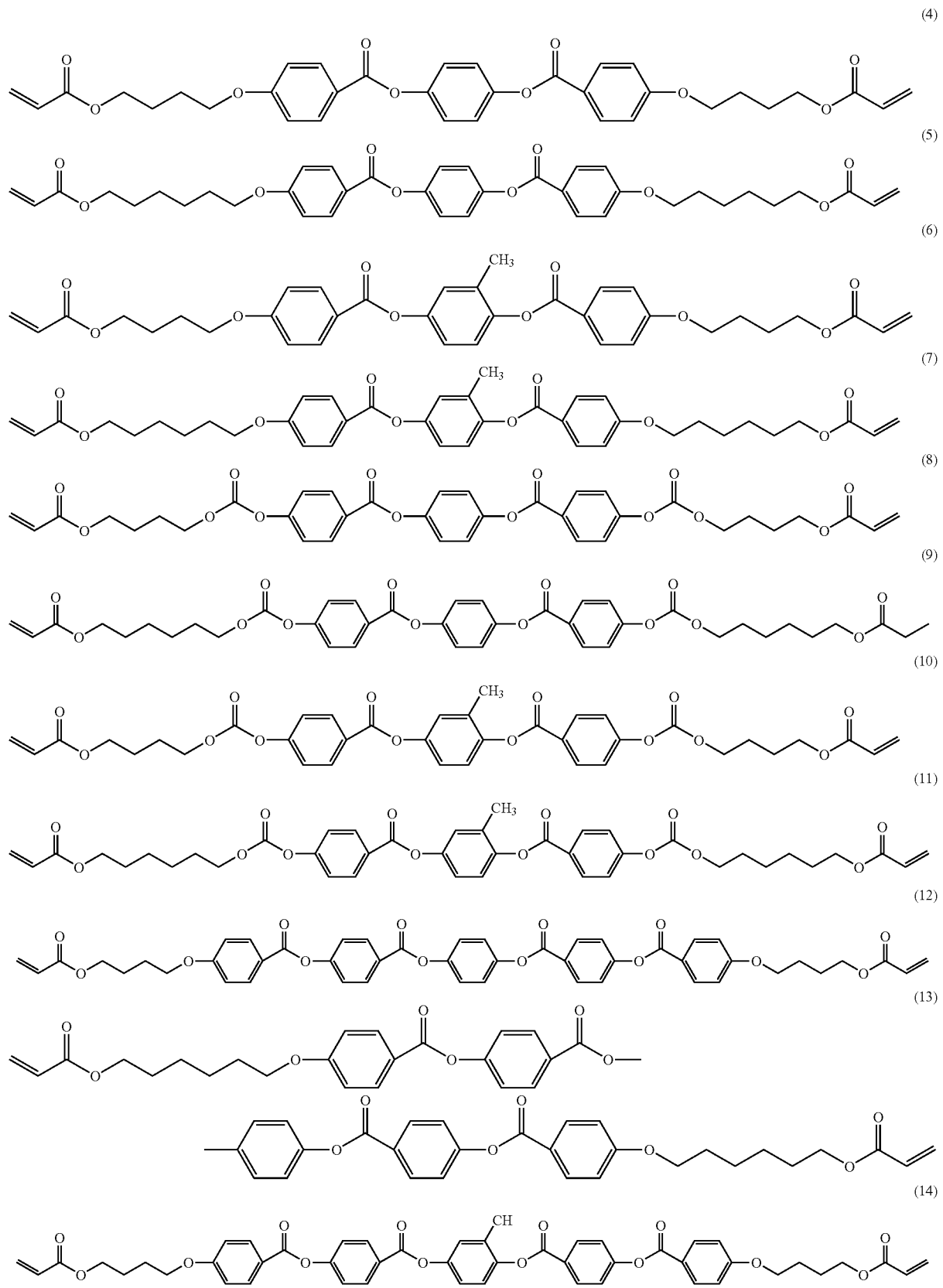

-continued

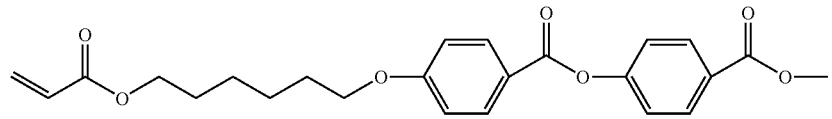

(15)

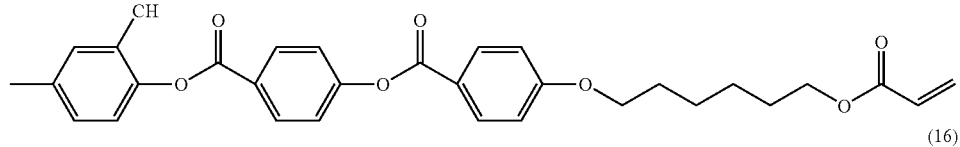

(16)

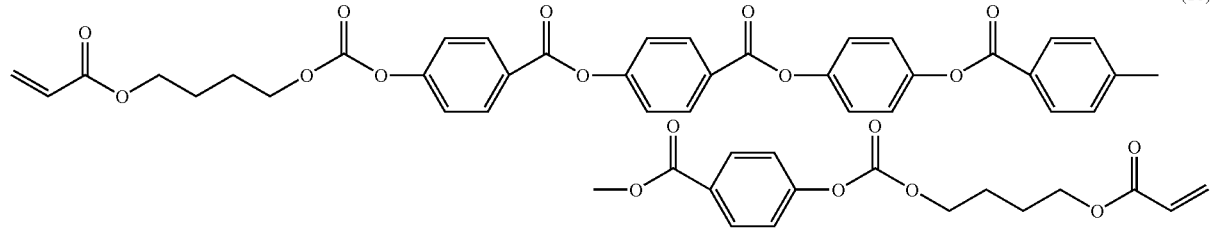

(17)

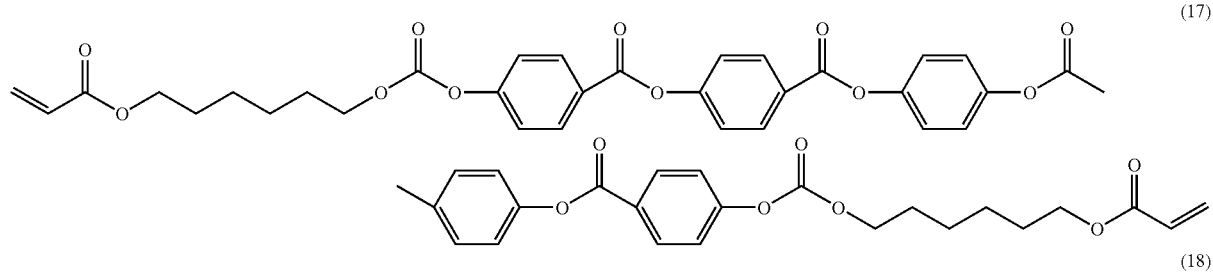

(18)

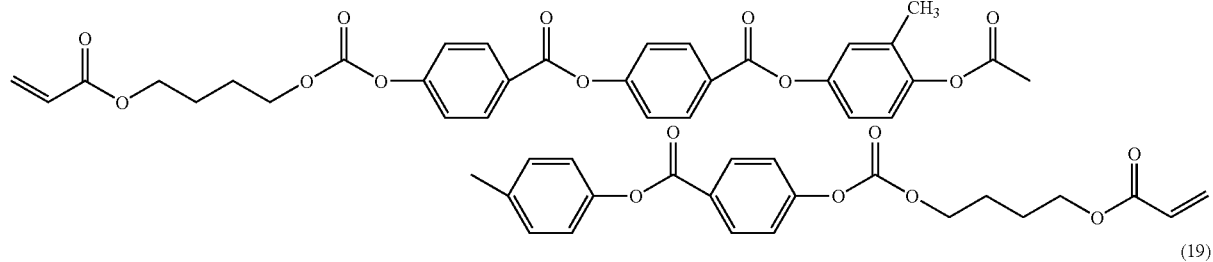

(19)

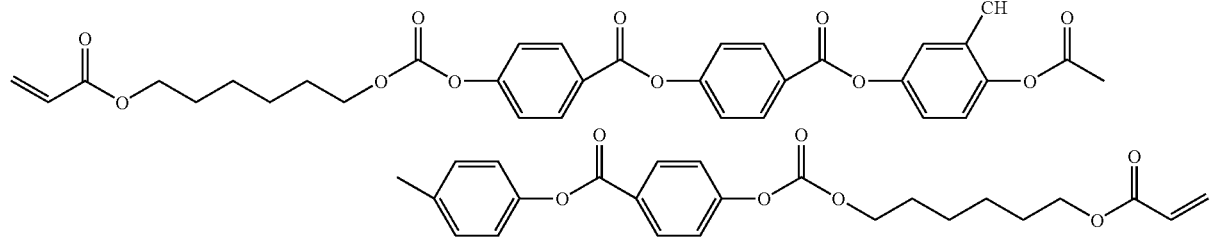

A temperature range in which the liquid crystal monomer exhibits liquid-crystallinity varies depending on the type of liquid crystal monomer. More specifically, the temperature range is preferably 40 to 120° C., more preferably 50 to 100° C., and most preferably 60 to 90° C.

C-3. Liquid Crystal Composition Forming Second Optical Compensation Layer (Cholesteric Alignment Fixed Layer): Chiral Agent The liquid crystal composition capable of forming the second optical compensation layer (cholesteric alignment fixed layer) preferably contains a chiral agent. By forming the second optical compensation layer from the composition containing the liquid crystal material and the chiral agent, it is possible to provide a large difference between nx and nz (i.e., nx>>nx). As a result, the second optical compensation layer may become very thin. For example, while conventional negative C plate obtained through biaxial stretching has a thickness of 60 μm or more, the second optical compensation layer used in the present invention can be thinned to have a thickness of approximately 1 to 2 μm in the case where it is a single layer of the cholesteric alignment fixed layer. Thus, the second optical compensation layer may greatly contribute to reduction in thickness of a liquid crystal panel.

A content of the chiral agent in the liquid crystal composition is preferably 5 to 23 wt %, and more preferably 10 to 20 wt %. In the case where the content of the chiral agent is less than 5 wt %, torsion cannot be sufficiently provided and thus the cholesteric alignment may not be formed sufficiently. As a result, a selective reflection wavelength region of the optical compensation layer to be obtained may be hardly controlled to a desired region (shorter wavelength side). In the case where the content of the chiral agent is more than 23 wt %, the liquid crystal material exhibits a liquid crystal state in a very narrow temperature range and a temperature during formation of an optical compensation layer must be controlled very accurately. As a result, production of the second compensation layer may involve difficulties. Such chiral agent may be used alone or in combination.

The chiral agent may employ any appropriate material capable of aligning the liquid crystal material into a desired cholesteric structure. For example, such a chiral agent has a torsional force of preferably $1 \times 10^{-6}$ nm$^{-1}$·(wt %)$^{-1}$ or more, more preferably $1 \times 10^{-5}$ nm$^{-1}$·(wt %)$^{-1}$ to $1 \times 10^{-2}$ nm$^{-1}$·(wt %) and most preferably $1 \times 10^{-4}$ nm$^{-1}$·(wt %) to $1 \times 10^{-3}$ nm$^{-1}$·(wt %). A chiral agent having such a torsional force may be used, to thereby control a helical pitch of the cholesteric alignment fixed layer within a desired range and control the selective reflection wavelength region within a desired range. For example, in the case where chiral agents of equal torsional force are used, a larger content of the chiral agent in the liquid crystal composition provides an optical compensation layer having a selective reflection wavelength region on a shorter wavelength side. For example, in the case where the content of the chiral agent in the liquid crystal composition is equal, a chiral agent having a larger torsional force provides an optical compensation layer having a selective reflection wavelength region on a shorter wavelength side. A specific example thereof is described below. For setting the selective reflection wavelength region of the optical compensation layer to be formed within a range of 200 to 220 nm, a liquid crystal composition may contain 11 to 13 wt % of a chiral agent having a torsional force of $5 \times 10^{-4}$ nm$^{-1}$·(wt %)$^{-1}$, for example. For setting the selective reflection wavelength region of the optical compensation layer to be formed within a range of 290 to 310 nm, a liquid crystal composition may contain 7 to 9 wt % of a chiral agent having a torsional force of $5 \times 10^{-4}$ nm$^{-1}$·(wt %)$^{-1}$, for example.

The chiral agent is preferably a polymerizable chiral agent. Specific examples of the polymerizable chiral agent include chiral compounds represented by the following general formulae (20) to (23).

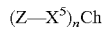　　　(20)

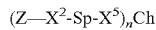　　　(21)

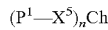　　　(22)

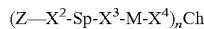　　　(23)

In the formulae (20) to (23), Z and Sp are the same as those defined for the above formula (2). $X^2$, $X^3$, and $X^4$ each independently represent a chemical single bond, —O—, —S—, —O—CO—, —CO—O—, —O—CO—O—, —CO—NR—, —NR—CO—, —O—CO—NR—, —NR—CO—O—, or —NR—CO—NR—. R represents H or an alkyl group having 1 to 4 carbon atoms. $X^5$ represents a chemical single bond, —O—, —S—, —O—CO—, —CO—O—, —O—CO—O—, —CO—NR—, —NR—CO—, —O—CO—NR—, —NR—CO—O—, —NR—CO—NR—, —CH$_2$O—, —O—CH$_2$—, —CH=N—, —N=CH—, or —N=N—. R represents H or an alkyl group having 1 to 4 carbon atoms as described above. M represents a mesogenic group as described above. $P^1$ represents hydrogen, an alkyl group having 1 to 30 carbon atoms, an acyl group having 1 to 30 carbon atoms, or a cycloalkyl group having 3 to 8 carbon atoms which is substituted by 1 to 3 alkyl groups having 1 to 6 carbon atoms. represents an integer of 1 to 6. Ch represents a chiral group with a valence of n. In the formula (23), at least one of $X^3$ and $X^4$ preferably represents —O—CO—O—, —O—CO—NR—, —NR—CO—O—, or —NR—CO—NR—. In the formula (22), in the case where $P^1$ represents an alkyl group, an acyl group, or a cycloalkyl group, its carbon chain may be interrupted by oxygen of an ether functional group, sulfur of a thioether functional group, a non-adjacent imino group, or an alkyl imino group having 1 to 4 carbon atoms.

Examples of the chiral group represented by Ch include atomic groups represented by the following formulae.

[Chem 7]

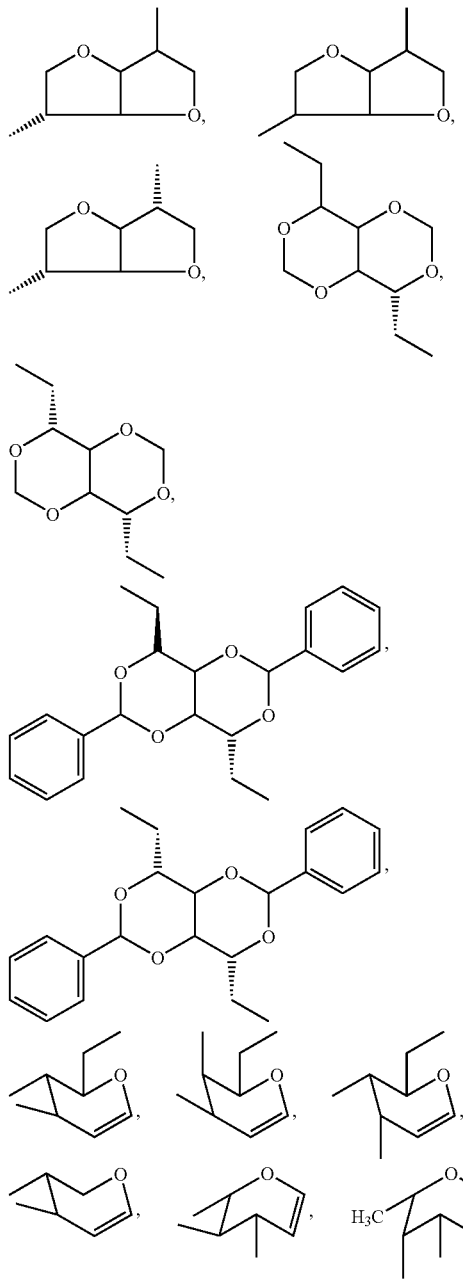

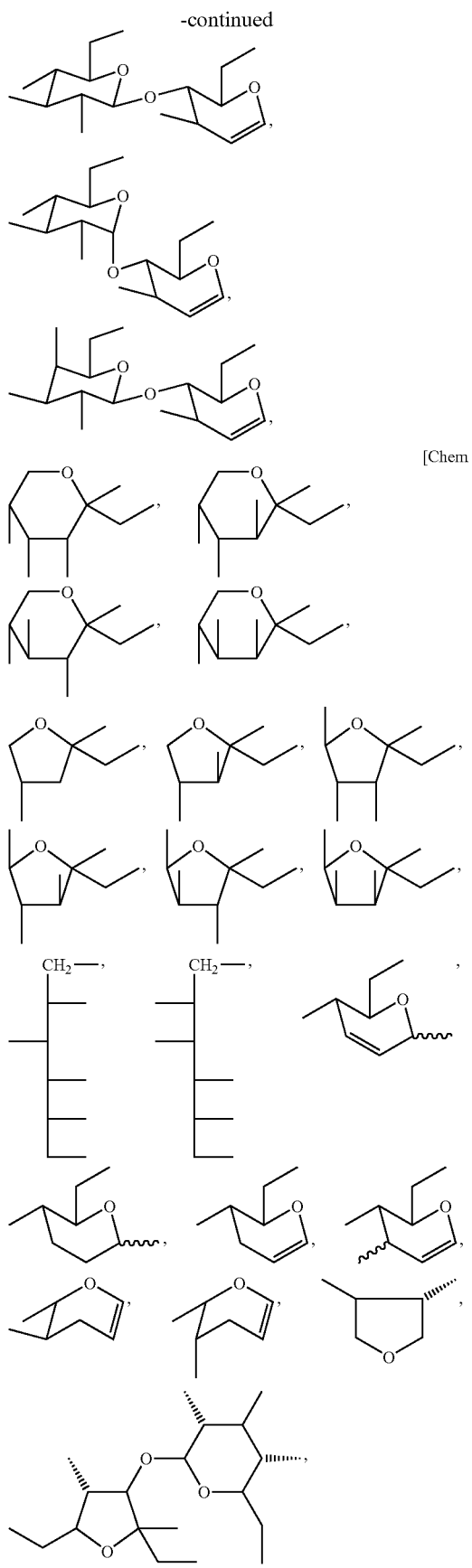

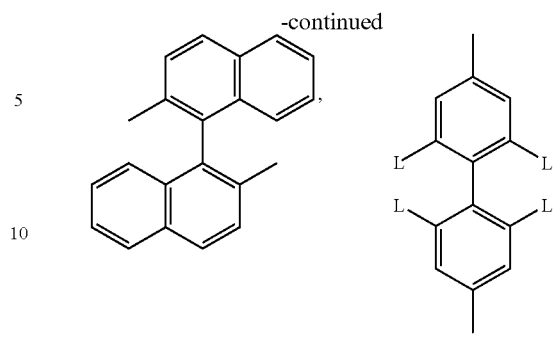

In the atomic groups described above, L represents an alkyl group having 1 to 4 carbon atoms, an alkoxy group having 1 to 4 carbon atoms, a halogen, COOR, OCOR, CONHR, or NHCOR. R represents an alkyl group having 1 to 4 carbon atoms. Note that terminals of the atomic groups represented in the above formulae each represent a bonding hand to an adjacent group.

Of the atomic groups, atomic groups represented by the following formulae are particularly preferred.

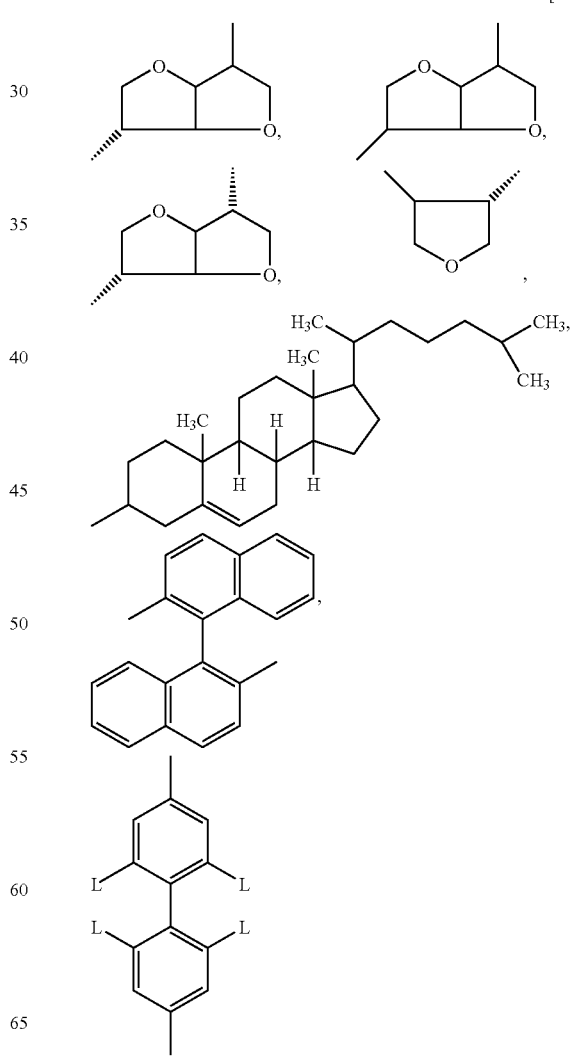

In a preferred example of the chiral compound represented by the above formula (21) or (23): n represents 2; Z represents $H_2C=CH—$; and Ch represents atomic groups represented by the following formulae.

[Chem 10]

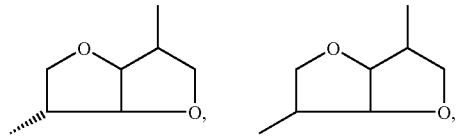

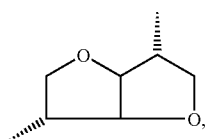

Specific examples of the chiral compound include compounds represented by the following formulae (24) to (44). Note that those chiral compounds each have a torsional force of $1\times10^{-6}$ $nm^{-1}\cdot(wt\%)^{-1}$ or more.

[Chem 11]

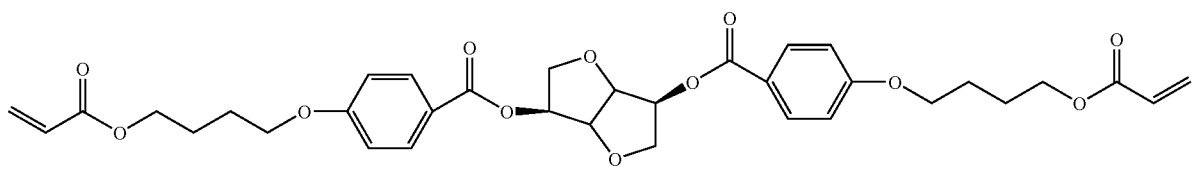

(24)

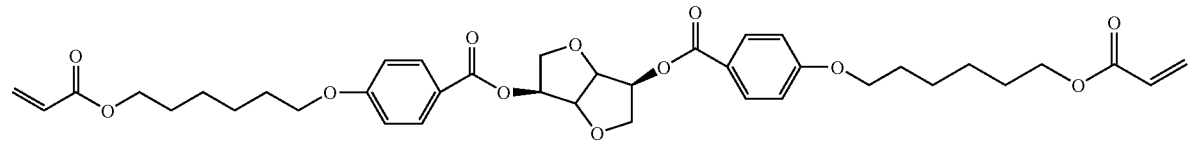

(25)

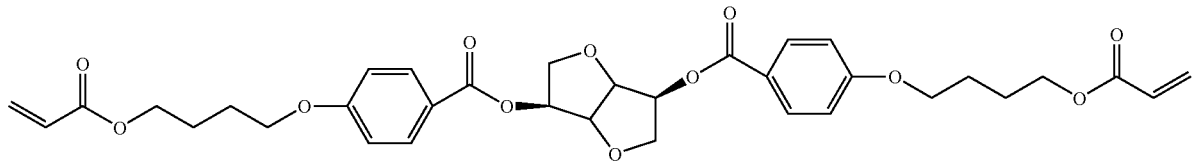

(26)

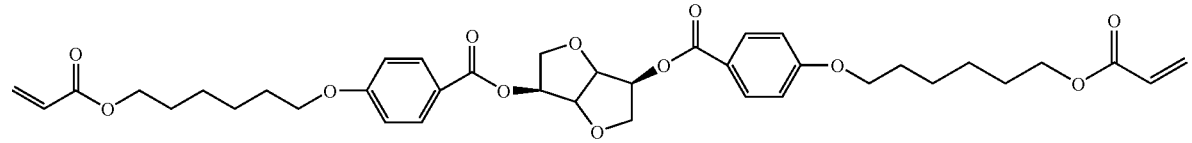

(27)

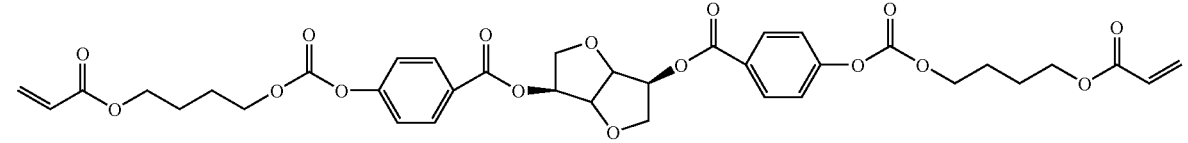

(28)

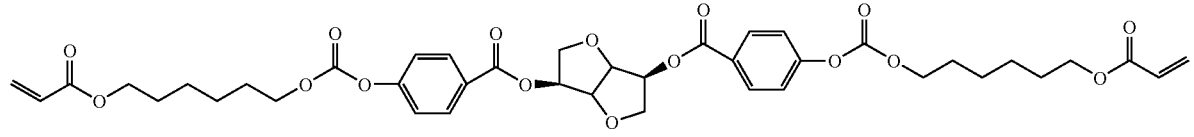

(29)

-continued
(30)
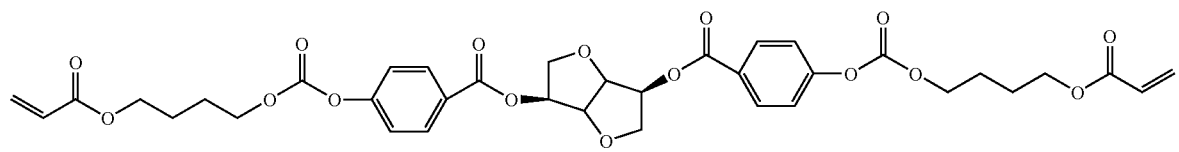
(31)
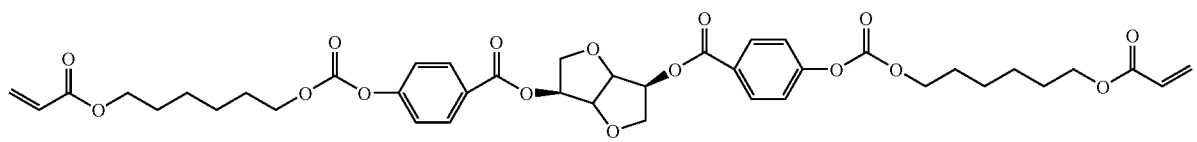
(32)
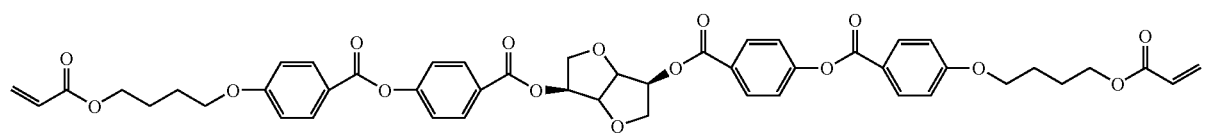
(33)
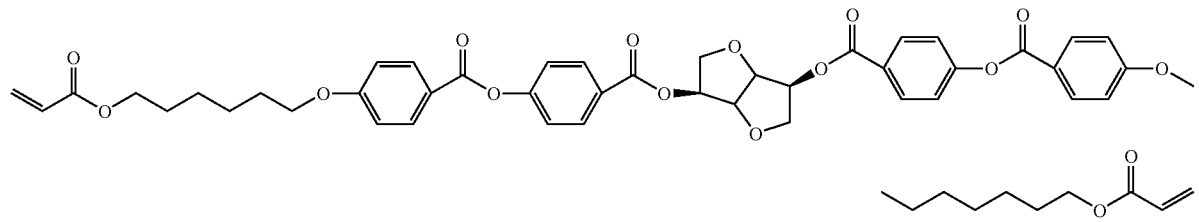
(34)
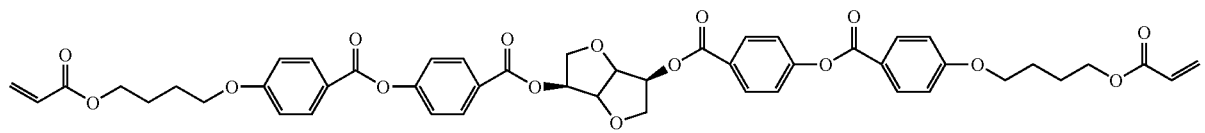
[Chem 12]
(35)
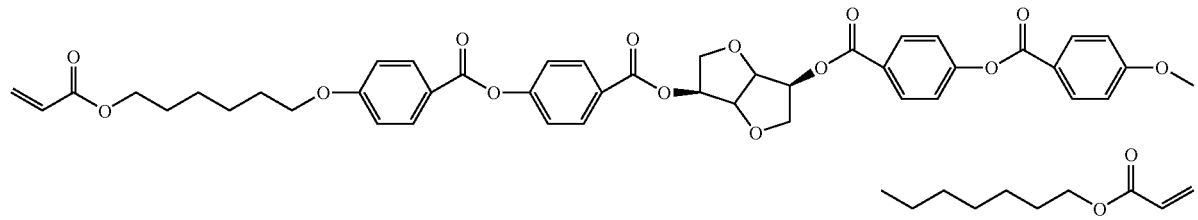
(36)
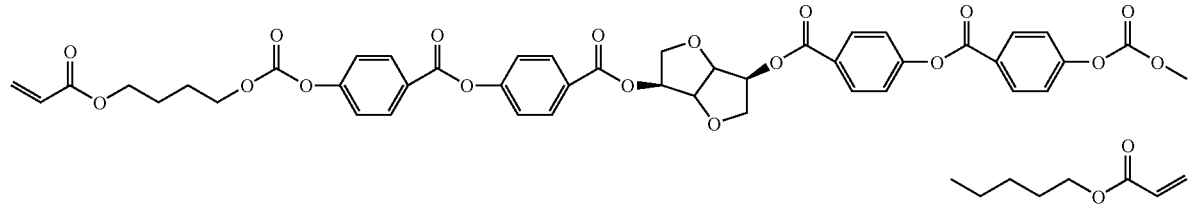

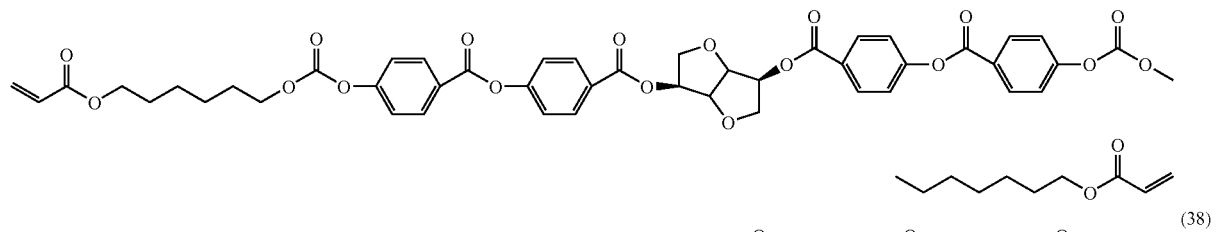
(37)
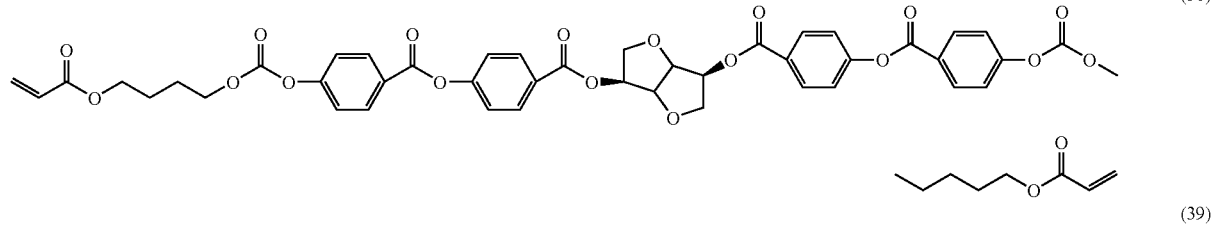
(38)
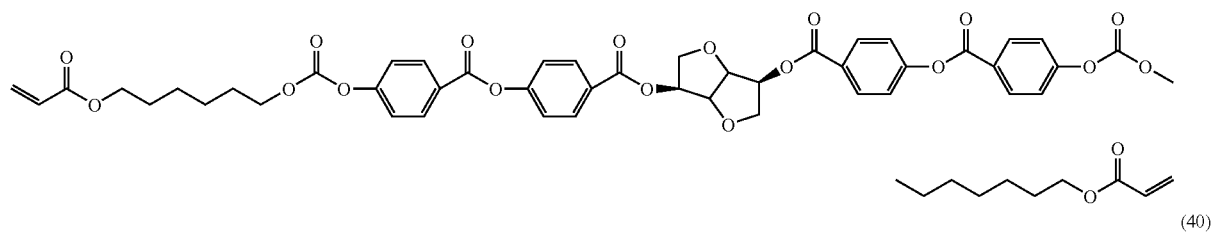
(39)
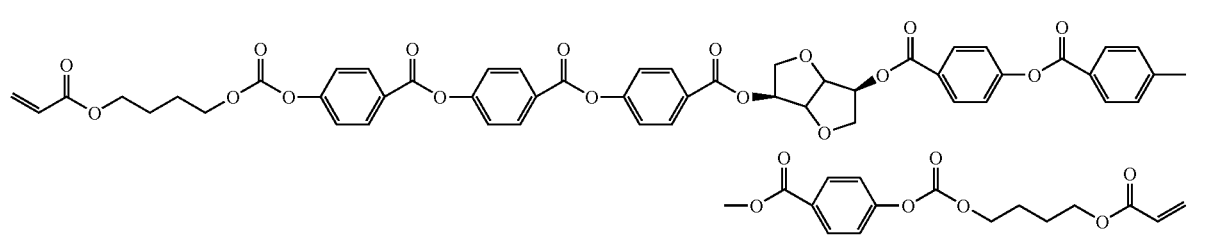
(40)
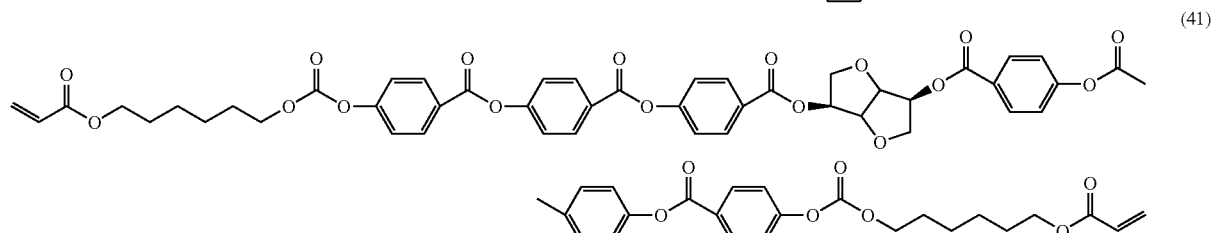
(41)
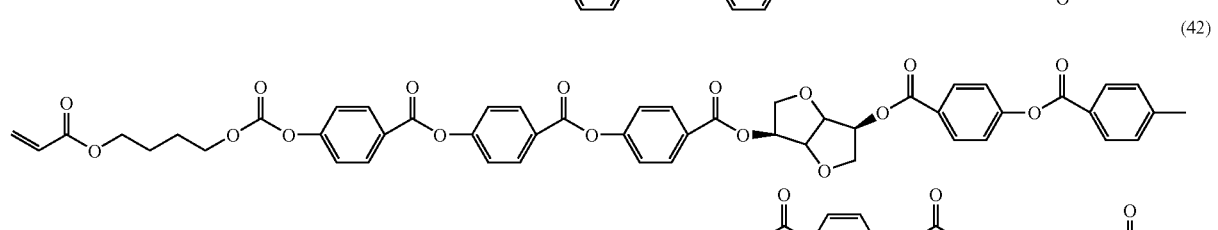
(42)
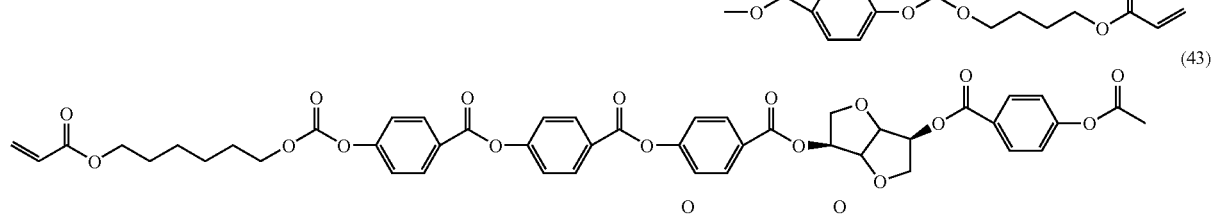
(43)

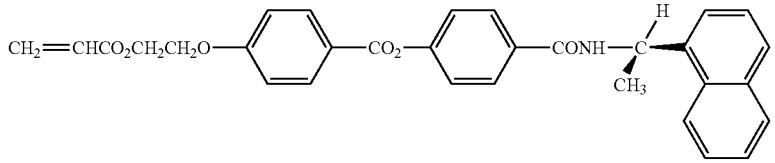

(44)

In addition to the chiral compounds represented above, further examples of the chiral compound include chiral compounds described in RE-A4342280, DE 19520660.6, and DE 19520704.1.

Note that any appropriate combination of the liquid crystal material and the chiral agent may be employed in accordance with the purpose. Particularly typical examples of the combination include: a combination of the liquid crystal monomer represented by the above formula (10)/the chiral agent represented by the above formula (38); and a combination of the liquid crystal monomer represented by the above formula (11)/the chiral agent represented by the above formula (39).

C-4. Liquid Crystal Composition Forming Second Optical Compensation Layer (Cholesteric Alignment Fixed Layer): Other Additives The liquid crystal composition capable of forming the second optical compensation layer (cholesteric alignment fixed layer) preferably contains at least one of a polymerization initiator and a crosslinking agent (curing agent). The polymerization initiator and/or the crosslinking agent (curing agent) is used, to thereby favorably fix the cholesteric structure (cholesteric alignment) of the liquid crystal material formed in a liquid crystal state. Any appropriate substance may be used for the polymerization initiator or the crosslinking agent as long as the effect of the present invention can be obtained. Examples of the polymerization initiator include benzoylperoxide (BPO) and azobisisobutyronitrile (AIBN). Examples of the crosslinking agent (curing agent) include a UV-curing agent, a photo-curing agent, and a heat-curing agent. Specific examples thereof include an isocyanate-based crosslinking agent, an epoxy-based crosslinking agent, and a metal chelate crosslinking agent. Such polymerization initiator or crosslinking agent may be used alone or in combination. A content of the polymerization initiator or the crosslinking agent in the liquid crystal composition is preferably 0.1 to 10 wt %, more preferably 0.5 to 8 wt %, and most preferably 1 to 5 wt %. In the case where the content of the polymerization initiator or the crosslinking agent is less than 0.1 wt %, the cholesteric structure may be fixed insufficiently. In the case where the content of the polymerization initiator or the crosslinking agent is more than 10 wt %, the liquid crystal material exhibits a liquid crystal state in a very narrow temperature range and temperature control during formation of the cholesteric structure may involve difficulties.

The liquid crystal composition may further contain any appropriate additive, as required. Examples of the additive include an antioxidant, modifier, surfactant, dye, pigment, discoloration inhibitor, and ultraviolet absorber. Those additives may be used alone or in combination. More specifically, examples of the antioxidant include a phenol-based compound, an amine-based compound, an organic sulfur-based compound, and a phosphine-based compound. Examples of the modifier include glycols, silicones, and alcohols. The surfactant is added, for example, in order to make the surface of an optical compensation layer smooth. Examples of the surfactant that can be used include a silicone-based surfactant, an acrylic surfactant, and a fluorine-based surfactant, and a silicone-based surfactant is particularly preferred.

C-5. Method of Forming Second Optical Compensation Layer (Cholesteric Alignment Fixed Layer)

Any appropriate method may be employed for the method of forming the second optical compensation layer (cholesteric alignment fixed layer) as long as the desired cholesteric alignment fixed layer can be obtained. A typical method of forming the second optical compensation layer (cholesteric alignment fixed layer) involves: spreading the liquid crystal composition on a substrate to form a spread layer; subjecting the spread layer to heat treatment such that the liquid crystal material in the liquid crystal composition is aligned in cholesteric alignment; subjecting the spread layer to at least one of polymerization treatment and crosslinking treatment to fix the alignment of the liquid crystal material; and transferring the cholesteric alignment fixed layer formed on the substrate. Hereinafter, a specific procedure for the method of forming the second optical compensation layer is described.

First, a liquid crystal material, a chiral agent, a polymerization initiator or a crosslinking agent, and various additives as required are dissolved or dispersed into a solvent to prepare a liquid crystal application liquid (a liquid crystal composition). The liquid crystal material, the chiral agent, the polymerization initiator, the crosslinking agent, and the additive are as described above. A solvent to be used in the liquid crystal application liquid is not particularly limited. Specific example thereof includes: halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, methoxybenzene, and 1,2-dimethoxybenzene; ketone-based solvents such as acetone, methylethylketone (MEK), methylisobutylketone, cyclohexanone, cyclopentanone, 2-pyrolidone, and N-methyl-2-pyrolidone; ester-based solvents such as ethyl acetate and butyl acetate; alcohol-based solvents such as t-butyl alcohol, glycerin, ethylene glycol, triethylene glycol, ethylene glycol monomethylether, diethylene glycol dimethylether, propylene glycol, dipropylene glycol, and 2-methyl-2,4-pentanediol; amide-based solvents such as dimethylformamide and dimethylacetoamide; nitrile-based solvents such as acetonitrile and butyronitrile; ether-based solvents such as diethylether, dibutylether, tetrahydrofian, and dioxane; carbon disufide; ethyl cellosolve; and butyl cellosolve. Of those, toluene, xylene, mesitylene, MEK, methyl isobutylketone, cyclohexanone, ethyl cellosolve, butyl cellosolve, ethyl acetate, butyl acetate, propyl acetate, and ethyl cellosolve acetate are preferred. Those solvents may be used alone or in combination.

A viscosity of the liquid crystal application liquid may vary depending on the content of the liquid crystal material or temperature. For example, in the case where a concentration of the liquid crystal material in the liquid crystal application liquid is 5 to 70 wt % at about room temperature (20 to 30° C.), the viscosity of the application liquid is preferably 0.2 to 20 mPa·s, more preferably 0.5 to 15 mPa·s, and most preferably 1 to 10 mPa·s. To be more specific, in the case where the concentration of the liquid crystal material in the liquid crystal application liquid is 30 wt %, the viscosity of the application liquid is preferably 2 to 5 mPa·s, and more preferably 3 to 4 mPa·s. The application liquid having a viscosity of 0.2 mPa·s or more can favorably prevent generation of liquid drip due to spreading of the application liquid. Further, the application liquid having a viscosity of 20 mPa·s or less can provide an optical compensation layer having very excellent surface smoothness without uneven thickness and excellent application property.

Next, the liquid crystal application liquid is applied onto the substrate to form a spread layer. The method of forming the spread layer may employ any appropriate method (typically, method of fluid spreading the application liquid). Specific examples thereof include a roll coating method, a spin coating method, a wire bar coating method, a dip coating method, an extrusion coating method, a curtain coating method, and a spray coating method. Of those, the spin coating method and the extrusion coating method are preferred from the viewpoint of coating efficiency.

An application amount of the liquid crystal application liquid may appropriately be set in accordance with the concentration of the application liquid, the thickness of the intended layer, and the like. For example, in the case where the concentration of the liquid crystal material in the application liquid is 20 wt %, the application amount is preferably 0.03 to 0.17 ml, more preferably 0.05 to 0.15 ml, and most preferably 0.08 to 0.12 ml per area (100 cm$^2$) of the substrate.

Any appropriate substrate capable of aligning the liquid crystal material may be used as the substrate. Typically, the substrate includes various plastic films. Specific examples of the plastic include cellulose-based plastics such as triacetyl cellulose (TAC), polyolefin such as polyethylene, polypropylene or poly(4-methylpentene-1), polyimide, polyamideimide, polyether imide, polyamide, polyetheretherketone, polyetherketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, an epoxy resin, and a phenol-resin. Further, a substrate in that a plastic film or sheet as described above is placed on the surface of, for example, a substrate made of metal such as aluminum, copper, or iron, a substrate made of ceramic, or a substrate made of glass can also be used. Furthermore, a substrate obtained by forming an SiO$_2$ oblique evaporation film on the surface of the plastic film or sheet can also be used. The thickness of a substrate is preferably 5 µm to 500 µm, more preferably 10 µm to 200 µm, and most preferably 15 µm to 150 µm. Such thickness provides sufficient strength for a substrate, and thus can prevent the generation of problems, for example, breaking upon manufacture.

Next, the spread layer is subjected to heat treatment to align the liquid crystal material in a state exhibiting a liquid crystal phase. The spread layer contains a chiral agent together with the liquid crystal material, and thus the liquid crystal material provided with torsion in a state exhibiting a liquid crystal phase is aligned. As a result, the spread layer (liquid crystal material forming the spread layer) forms the cholesteric structure (helical structure).

The temperature conditions for the heat treatment may appropriately be set in accordance with the type of liquid crystal material (specifically, temperature at which the liquid crystal material exhibits liquid crystallinity). To be more specific, the heating temperature is preferably 40 to 120° C., more preferably 50 to 100° C., and most preferably 60 to 90° C. A heating temperature of 40° C. or higher generally allows sufficient alignment of the liquid crystal material. A heating temperature of 120° C. or lower expands selection of the substrate in consideration of heat resistance, for example, and thus allows selection of an optimal substrate in accordance with the liquid crystal material. Further, a heating time is preferably 30 seconds or more, more preferably 1 minute or more, particularly preferably 2 minutes or more, and most preferably 4 minutes or more. In the case where a treatment time is less than 30 seconds, the liquid crystal material may not sufficiently exhibit a liquid crystal state. Further, the heating time is preferably 10 minutes or less, more preferably 8 minutes or less, and most preferably 7 minutes or less. In the case where the treatment time is more than 10 minutes, the additives may be sublimed.

Next, the spread layer containing the liquid crystal material exhibiting a cholesteric structure is subjected to at least one of polymerization treatment and crosslinking treatment to fix the alignment (cholesteric structure) of the liquid crystal material. To be more specific, the polymerization treatment is performed, to thereby polymerize the liquid crystal material (polymerizable monomer) and/or chiral agent (polymerizable chiral agent) and fix the polymerizable monomer and/or polymerizable chiral agent as a repeating unit of polymer molecules. Further, the crosslinking treatment is preformed, to thereby form a three-dimensional network structure of the liquid crystal material (crosslinking monomer) and/or chiral agent and fix the crosslinking monomer and/or chiral agent as a part of a crosslinked structure. As a result, an alignment state of the liquid crystal material is fixed. Note that the polymer or three-dimensional network structure to be formed through polymerization or crosslinking of the liquid crystal material is "non-liquid crystalline". The thus-formed second optical compensation layer does not transfer into a liquid crystal phase, glass phase, or crystal phase due to temperature change unique to a liquid crystal compound, for example, and no alignment change due to temperature occurs. As a result, the thus-formed second optical compensation layer may be used as a high performance optical compensation layer not affected by the temperature change. The second optical compensation layer has a selective reflection wavelength region optimized within a range of 100 nm to 320 nm, and thus can significantly suppress light leak and the like.

A specific procedure for the polymerization treatment or crosslinking treatment may appropriately be selected in accordance with the type of polymerization initiator or crosslinking agent to be used. For example, a photo-polymerization initiator or photo-crosslinking agent may be used for photoirradiation. A UV polymerization initiator or UV crosslinking agent may be used for UV irradiation, and heat polymerization initiator or heat crosslinking agent may be used for heating. The irradiation time of light or UV light, the irradiation intensity, the total irradiation amount, and the like may appropriately be set in accordance with the type of liquid crystal material, the type of substrate, properties desired for the second optical compensation layer, and the like. Similarly, the heating temperature, the heating time, and the like may appropriately be set in accordance with the purpose.

The cholesteric alignment fixed layer formed on the substrate as described above is transferred onto a surface of the first optical compensation layer 20 to form the second optical compensation layer 30. In the case where the second optical compensation layer has a laminate structure of the cholesteric alignment fixed layer and the plastic film layer, the plastic film layer may be attached to the first optical compensation layer through a pressure-sensitive adhesive layer and the cholesteric alignment fixed layer may be transferred to the plastic layer, to thereby form the second optical compensation layer. Alternatively, the plastic film layer may be attached to the cholesteric alignment fixed layer formed on the substrate through an adhesive layer to form a laminate, and the laminate may be attached to the surface of the first optical compensation layer through a pressure-sensitive adhesive layer. The transfer step further includes peeling the substrate from the second optical compensation layer. The plastic film layer is as described in the above section C-1.

A typical example of an adhesive used for forming the adhesive layer includes a curable adhesive. Typical examples of the curable adhesive include: a photo-curable adhesive such as a UV-curable adhesive; a moisture-curable adhesive; and a heat-curable adhesive. A specific example of the heat-curable adhesive includes a thermosetting resin-based adhesive formed of an epoxy resin, an isocyanate resin, a polyimide resin, or the like. A specific example of the moisture-curable adhesive includes an isocyanate resin-based moisture-curable adhesive. The moisture-curable adhesive (in particular, an isocyanate resin-based moisture-curable adhesive) is preferred. The moisture-curable adhesive cures through a reaction with moisture in air, water adsorbed on a surface of an adherend, an active hydrogen group of a hydroxyl group or a carboxyl group or the like, etc. Thus, the adhesive may be applied and then cured naturally by leaving at stand, and has excellent operability. Further, the moisture-curable adhesive requires no heating for curing, and thus the second optical compensation layer is not heated during lamination (bonding). As a result, no heat shrinkage occurs, and thus formation of cracks during lamination or the like may significantly be prevented even in the case where the second optical compensation layer has a very small thickness as in the present invention. In addition, the curable adhesive hardly stretches or shrinks under heating after curing. Thus, formation of cracks during lamination or the like may significantly be prevented even in the case where the second optical compensation layer has a very small thickness and where a liquid crystal panel to be obtained is used under high temperature conditions. Note that the isocyanate resin-based adhesive is a general term for a polyisocyanate-based adhesive and a polyurethane resin adhesive.

For example, a commercially available adhesive may be used as the curable adhesive, or various curable resins may be dissolved or dispersed in a solvent to prepare a curable resin adhesive solution (or dispersion). In the case where the solution (or dispersion) is prepared, a ratio of the curable resin in the solution is preferably 10 to 80 wt %, more preferably 20 to 65%, especially preferably 25 to 65 wt %, and most preferably 30 to 50 wt % in solid content. Any appropriate solvent may be used as the solvent in accordance with the type of curable resin, and specific examples thereof include ethyl acetate, methyl ethyl ketone, methyl isobutyl ketone, toluene, and xylene. Such solvent may be used alone or in combination.

An application amount of the adhesive may appropriately be set in accordance with the purpose. For example, the application amount is preferably 0.3 to 3 ml, more preferably 0.5 to 2 ml, and most preferably 1 to 2 ml per area ($cm^2$) of the second optical compensation layer. After the application, the solvent in the adhesive is evaporated through natural drying or heat drying as required. A thickness of the adhesive layer to be obtained is preferably 0.1 to 20 µm, more preferably 0.5 to 15 µm, and most preferably 1 to 10 µm. A Microhardness of the adhesive layer is preferably 0.1 to 0.5 GPa, more preferably 0.2 to 0.5 GPa, and most preferably 0.3 to 0.4 GPa. Correlation between Microhardness and Vickers hardness is known, and thus the Microhardness may be converted into Vickers hardness. The Microhardness may be calculated from indentation depth and indentation load by using a thin-film hardness meter (trade names, MH4000 and MHA-400, for example) manufactured by NEC Corporation.

The above-mentioned typical example of the method of forming the second optical compensation layer employs a liquid crystal monomer (polymerizable monomer or crosslinking monomer, for example) as the liquid crystal material, but the method of forming the second optical compensation layer of the present invention is not limited to such a method and may be a method which employs a liquid crystalline polymer. However, the method preferably employs a liquid crystal monomer as described above. The liquid crystal monomer may be used, to thereby form an optical compensation layer having an excellent optical compensation function and reduced thickness. To be specific, use of the liquid crystal monomer facilitates control of the selective reflection wavelength region. Further, the viscosity of the application liquid and the like may easily be set by using the liquid crystal monomer, to thereby facilitate formation of a extremely thin second optical compensation layer. Further, the liquid crystal monomer has excellent handling property. In addition, the optical compensation layer to be obtained has even better surface smoothness.

Referring to FIGS. 1(*a*) and 1(*b*), the second optical compensation layer 30 is arranged between the first optical compensation layer 20 and the liquid crystal cell 40. Any appropriate method may be employed as a method of arranging the second optical compensation layer in accordance with the purpose. Typically, the second optical compensation layer 30 is bonded to the first optical compensation layer 20 through the above-described adhesive layer, is then provided with a pressure-sensitive adhesive layer on the opposite side with respect to the first compensation layer, and bonded to the liquid crystal cell through a pressure-sensitive adhesive layer. The details of the pressure-sensitive adhesive layer are described in the above section B.

D. Third Optical Compensation Layer

As described above, the third optical compensation layer 50 contains a resin having an absolute value of photoelastic coefficient of $2 \times 10^{-11}$ $m^2/N$ or less, and has a refractive index profile of nx>ny=nz. The in-plane retardation $Re_3$ of the third optical compensation layer is preferably 100 to 180 nm, more preferably 110 to 160 nm, and most preferably 120 to 140 nm. The thickness direction retardation $Rth_3$ of the third optical compensation layer is preferably 45 to 85 nm, more preferably 55 to 75 nm, and most preferably 60 to 70 nm. The thickness of the third optical compensation layer is set to provide desired in-plane retardation and thickness direction retardation. Specifically, the thickness of the third optical compensation layer is preferably 25 to 55 µm, more preferably 30 to 40 µm, and most preferably 33 to 37 µm.

The third optical compensation layer 50 contains a resin having an absolute value of photoelastic coefficient of $2 \times 10^{-11}$ $m^2/N$ or less, preferably $2.0 \times 10^{-13}$ to $1.0 \times 10^{-11}$ $m^2/N$, and more preferably $1.0 \times 10^{-12}$ to $1.0 \times 10^{-11}$ $m^2/N$. An absolute value of photoelastic coefficient within the above ranges hardly causes change in retardation due to shrinkage stress under heating. Thus, the third optical compensation layer may be formed by using a resin having such an absolute value of photoelastic coefficient and by using such third optical compensation layer in combination with the first optical compensation layer, to thereby favorably prevent uneven display due to heat of a liquid crystal panel to be obtained.

Typical examples of the resin capable of satisfying such a photoelastic coefficient include a cyclic olefin-based resin and a cellulose-based resin. The details of the cyclic olefin-based resin and the cellulose-based resin are as described in the above section B.

The in-plane retardation $Re_3$ and the thickness direction retardation $Rth_3$ of the third optical compensation layer 50 may be controlled by varying the stretch ratio and the stretching temperature of the cyclic olefin-based resin film and the cellulose-based resin film described in the above section B. The stretch ratio may vary depending on the in-plane and thickness direction retardation values and the thickness desired for the third optical compensation layer, the type of resin to be used, the thickness of the film to be used, the stretching temperature, and the like. Specifically, the stretch ratio is preferably 1.10 to 1.50 times, more preferably 1.15 to 1.45 times, and most preferably 1.24 to 1.32 times. Stretching at such a stretch ratio may provide a third optical compensation layer having an in-plane retardation and a thickness direction retardation which may appropriately exhibit the effect of the present invention.

The stretching temperature may vary depending on the in-plane and thickness direction retardation values and the thickness desired for the third optical compensation layer, the type of resin to be used, the thickness of the film to be used, the stretch ratio, and the like. Specifically, the stretching temperature is preferably 130 to 150° C., more preferably 135 to 145° C., and most preferably 137 to 143° C. Stretching at such a stretching temperature may provide a third optical compensation layer having an in-plane retardation and a thickness direction retardation which may appropriately exhibit the effect of the present invention.

Referring to FIG. 1(a), the third optical compensation layer 50 is arranged between the second polarizer 10' and the liquid crystal cell 40. Any appropriate method may be employed as a method of arranging the third optical compensation layer in accordance with the purpose. Typically, the third optical compensation layer 50 is provided with a pressure-sensitive adhesive layer (not shown) on the liquid cell side thereof, is bonded to the liquid cell 40, is then provided with a pressure-sensitive adhesive layer (not shown) on the second polarizer side thereof, and is bonded to the second polarizer 10'. Alternatively, the second polarizer 10' and the third optical compensation layer 50 may be attached to form a laminate and then the laminate may be bonded to the liquid cell. In the case where the fourth optical compensation layer 60 is provided as shown in FIG. 1(b), the third optical compensation layer 50 is arranged between the second polarizer 10' and the fourth optical compensation layer 60. In this case, the same method as that described above may be employed as a method of arranging the third optical compensation layer. The details of the pressure-sensitive adhesive layer are as described in the above section B.

E. Fourth Optical Compensation Layer

As shown in FIG. 1(b), the liquid crystal panel of the present invention may further include the fourth optical compensation layer 60 between the third optical compensation layer 50 and the liquid cell 40. The fourth optical compensation layer 60 has a refractive index profile of nx=ny>nz and may function as a negative C plate. Since the details of the optical properties, the forming material and the forming method of the fourth optical compensation layer 60 are described in the above section C with regard to the second optical compensation layer, they are not described repeatedly.

F. Polarizer

Any suitable polarizers may be employed as the first and second polarizers 10 and 10' in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 1 to 80 µm. The first and second polarizers 10 and 10' may be identical to or different from each other.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination or an antiblocking agent on a film surface, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

G. Protective Film

Any suitable protective film which can be used as a protective layer for a polarizer may be employed as the protective film. Specific examples of a material used as a main component of the film include transparent resins such as a cellulose-based resin (such as triacetylcellulose (TAC)), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. More specifically, the film in the publication is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin and a glassy polymer are preferred. TAC is especially preferred.

It is preferred that the protective film be transparent and have no color. More specifically, the protective film has a thickness direction retardation of preferably −90 nm to +90 nm, more preferably −80 nm to +80 nm, and most preferably −70 nm to +70 nm.

The protective film has any suitable thickness as long as the preferred thickness direction retardation can be obtained. More specifically, the thickness of the protective film is preferably 5 mm or less, more preferably 1 mm or less, especially preferably 1 to 500 μm, and most preferably 5 to 150 μm.

The surface of the protective film arranged at the outer side of the first and second polarizers 10 and 10' (that is, the opposite side with respect to the optical compensation layers) may be subjected to hard coat treatment, antireflection treatment, anti-sticking treatment, anti-glare treatment, or the like as required.

H. Other Components of Liquid Crystal Panel

The liquid crystal panel of the present invention may further include another optical layer. Any suitable optical layers may be employed as the other optical layer in accordance with the purpose or the type of liquid crystal panel. Specific examples of the other optical layer include a liquid crystal film, a light scattering film, a diffraction film and other optical compensation layer (retardation film).

Each layer of the liquid crystal panel of the present invention may be provided with UV absorbability through treatment with a UV absorber such as a salicylate-based compound, a benzophenone-based compound, a benzotriazole-based compound, a cyanoacrylate-based compound, or a nickel complex salt-based compound.

I. Liquid Crystal Display Apparatus

As descried above, the liquid crystal panel of the present invention may be preferably applicable to any of a transmissive liquid crystal display apparatus, a reflective liquid crystal display apparatus and a semi-transmissive reflective liquid crystal display apparatus. In the case where the liquid crystal panel is used in a transmissive liquid crystal display apparatus, the liquid crystal display apparatus is provided with a brightness enhancement film, a prism sheet, a light guide plate, a backlight and the like on the back side (i.e., the opposite side with respect to the viewer side) of the liquid crystal panel of the present invention.

Hereinafter, the present invention is described more specifically by way of examples. However, the present invention is not limited to the examples. Methods of measuring properties in examples are described below.

(1) Measurement of Thickness

The thickness of each of the polarizer and the optical compensation layers of Examples and Comparative Examples was measured by using Dial Gauge manufactured by Ozaki Mfg. Co., Ltd.

(2) Measurement of Contrast

The contrast was calculated by using the following procedure: a white image and a black image were displayed on a liquid crystal display apparatus, and Y values of an XYZ display system were measured by using "EZ Contrast 160D" (trade name, manufactured by ELDIM SA). A contrast "YW/YB" was calculated from a Y value (YW) of the white image and a Y value (YB) of the black image.

(3) Measurement of Thickness Direction Retardation

The thickness direction retardation was measured by using an automatic birefringence analyzer ("KOBRA-21ADH", trade name, manufactured by Oji Scientific Instruments) based on a parallel Nicol rotation method by using light of a wavelength of 590 nm at 23° C.

Example 1

Liquid Crystal Cell

A liquid crystal cell installed in PSP (Play Station Portable) manufactured by Sony Corporation was used. The thickness direction retardation $Rth_c$ of the liquid crystal cell was 320 nm.

(Production of Polarizer)

A commercially available polyvinyl alcohol (PVA) film (available from Kuraray Co., Ltd.) was colored in an aqueous solution containing iodine and uniaxially stretched to about a 6 times length between rolls having different speed ratios in an aqueous solution containing boric acid, to thereby obtain a continuous polarizer. A commercially available TAC film (available from Fuji Photo Film Co., Ltd.) was attached to a side of the polarizer on which an optical compensation layer is not arranged by using a PVA-based adhesive, to thereby obtain a polarizing plate (protective film/polarizer). This polarizing plate was punched out into a size corresponding to the liquid crystal cell. Two polarizing plates thus obtained were used as the first and the second polarizers.

(Production of First Optical Compensation Layer)

A continuous norbornene-based resin film (trade name, Zeonoa, available from Zeon Corporation, thickness of 60 μm, photoelastic coefficient of $3.10 \times 10^{-12}$ m$^2$/N) was uniaxially stretched to a 1.28 times length at 140° C., to thereby produce a continuous film for a first optical compensation layer. This film was punched out into a size corresponding to the liquid crystal cell and used as the first optical compensation layer. The obtained first optical compensation layer had a thickness of 35 μm, an in-plane retardation $Re_1$ of 130 nm, and a thickness direction retardation $Rth_1$ of 65 nm.

(Production of Second Optical Compensation Layer)

90 parts by weight of a nematic liquid crystal compound represented by the following formula (10), 10 parts by weight of a chiral agent represented by the following formula (38), 5 parts by weight of a photo-polymerization initiator (Irgacure 907, available from Ciba Specialty Chemicals), and 300 parts by weight of methyl ethyl ketone were mixed uniformly, to thereby prepare a liquid crystal application liquid. This liquid crystal application liquid was used to coat a substrate (biaxially stretched PET film), subjected to heat treatment at 80° C. for 3 minutes, and subjected to polymerization treatment by irradiating the liquid crystal application liquid with UV light, to thereby form a cholesteric alignment fixed layer (having a thickness of 2 μm). Then, an isocyanate-based curable adhesive (thickness of 5 μm) was applied onto the cholesteric alignment fixed layer and a plastic film layer (a TAC film: thickness of 40 μm) was attached to the cholesteric alignment fixed layer through the isocyanate-based curable adhesive, to thereby form a laminate. The laminate was punched out into a size corresponding to the liquid crystal cell and used as the second optical compensation layer. The obtained second optical compensation layer had a thickness of 47 μm, an in-plane retardation $Re_2$ of 0 nm, and a thickness direction retardation $Rth_2$ of 160 nm.

[Chem 13]

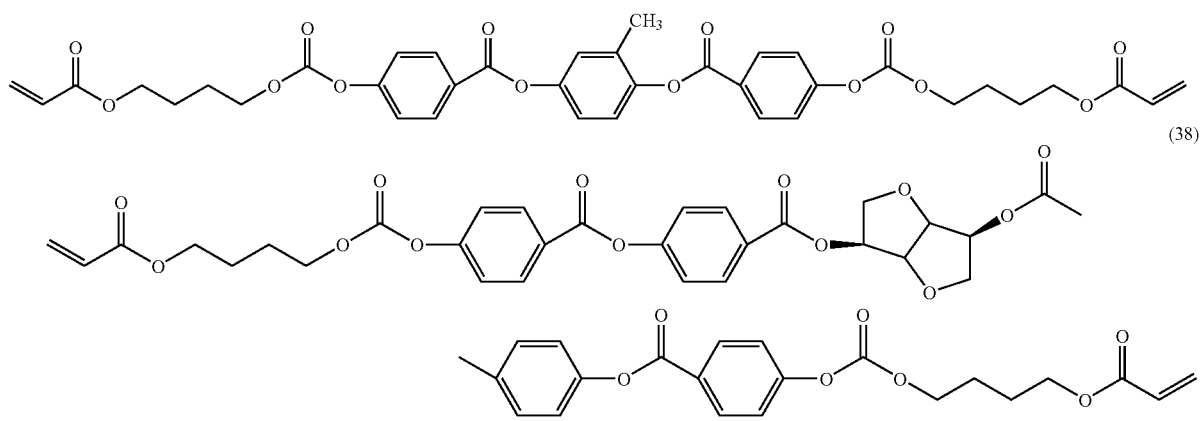

(Production of Third Optical Compensation Layer)

A continuous norbornene-based resin film (trade name, Zeonoa, available from Zeon Corporation, thickness of 60 μm, photoelastic coefficient of $3.10 \times 10^{-12}$ m$^2$/N) was uniaxially stretched to a 1.28 times length at 140° C., to thereby produce a continuous film for a third optical compensation layer. This film was punched out into a size corresponding to the liquid crystal cell and used as the third optical compensation layer. The obtained third optical compensation layer had a thickness of 35 μm, an in-plane retardation $Re_3$ of 130 nm, and a thickness direction retardation $Rth_3$ of 65 nm.

(Production of Liquid Crystal Panel)

The liquid crystal cell, the first polarizer, the second polarizer, the first optical compensation layer, the second optical compensation layer and the third optical compensation layer thus obtained were attached through an acrylic pressure-sensitive adhesive (thickness of 20 μm), to thereby obtain a liquid crystal panel as shown in FIG. 1(a). The first polarizer and the second polarizer were arranged such that the respective absorption axes were perpendicular to each other. Furthermore, the first polarizer and the second polarizer were arranged such that the respective protective films were positioned outer side. The first optical compensation layer was arranged such that the slow axis thereof defines an angle of −45° with respect to the absorption axis of the first polarizer (the polarizer on the opposite side with respect to the viewer side). The third optical compensation layer was arranged such that the slow axis thereof defines an angle of 45° with respect to the absorption axis of the first polarizer. The difference between the sum $\Sigma Rth_{1-n}$ of the thickness direction retardation of all the optical compensation layers and the thickness direction retardation $Rth_c$ of the liquid crystal cell in the obtained liquid crystal panel was −30 nm.

Figure 3:
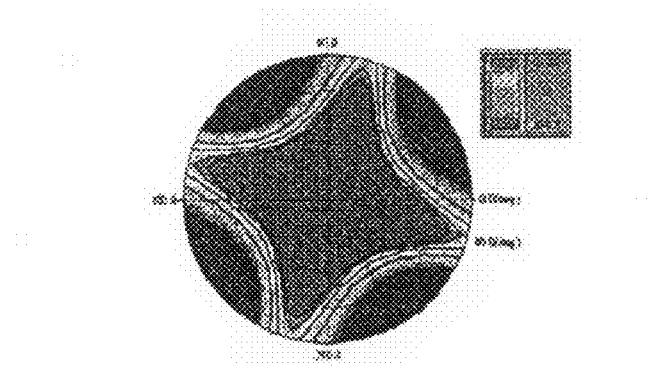
FIG. 3 A contour map showing a viewing angle dependence of contrast of a liquid crystal panel according to an example of the present invention.

A liquid crystal display apparatus was fabricated by using the obtained liquid crystal panel and by employing conventional procedure. Contrast of the obtained liquid crystal display apparatus was measured. A contour map of the measurement results was shown in FIG. 3.

Example 2

Figure 4:
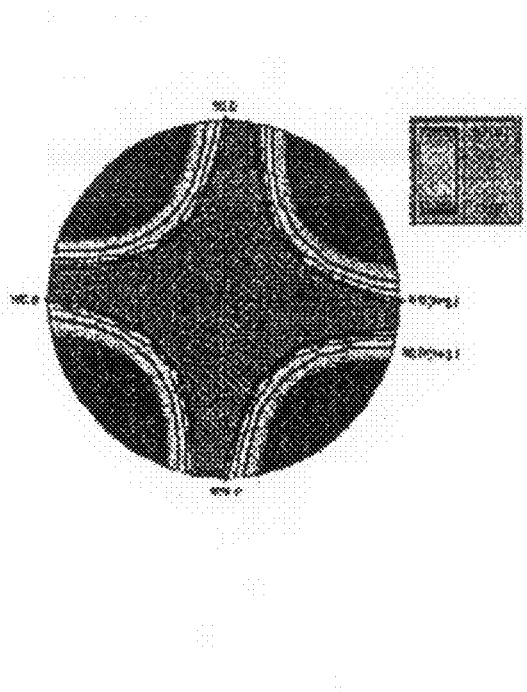
FIG. 4 A contour map showing a viewing angle dependence of contrast of a liquid crystal panel according to another example of the present invention.
Figure 5:
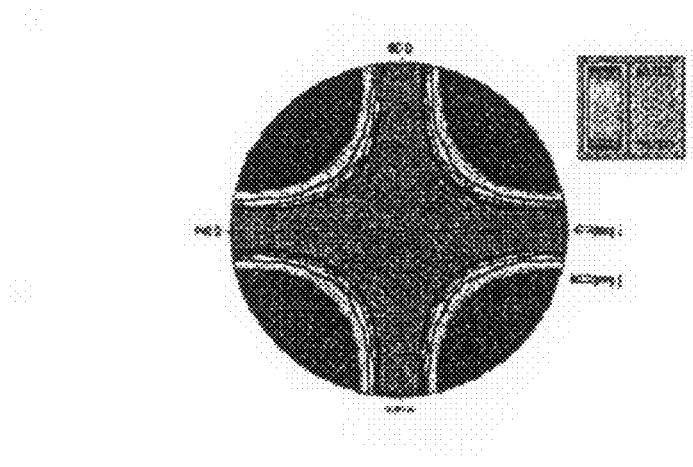
FIG. 5 A contour map showing a viewing angle dependence of contrast of a liquid crystal panel according to still another example of the present invention.

A liquid crystal panel was obtained in the same manner as Example 1 except that the thickness of the cholesteric alignment fixed layer in the second optical compensation layer was 2.6 μm. The obtained second optical compensation layer had a thickness direction retardation $Rth_2$ of 200 nm. The difference between the sum $\Sigma Rth_{1-n}$ of the thickness direction retardation of all the optical compensation layers and the thickness direction retardation $Rth_c$ of the liquid crystal cell in the obtained liquid crystal panel was 10 nm. A liquid crystal display apparatus was fabricated by using the obtained liquid crystal panel and by employing conventional procedure. Contrast of the obtained liquid crystal display apparatus was measured. A contour map of the measurement results was shown in FIG. 4.

Example 3

A cholesteric alignment fixed layer (thickness of 2 μm) was formed on a substrate in the same manner as Example 1. The cholesteric alignment fixed layer was transferred through an isocyanate-based curable adhesive (thickness of 5 μm) onto the surface of the first optical compensation layer obtained in the same manner as Example 1. The single cholesteric alignment fixed layer was used as the second optical compensation layer. The cholesteric alignment fixed layer obtained as described above was transferred onto the surface of the third optical compensation layer obtained in the same manner as Example 1. This cholesteric alignment fixed layer was used as the fourth optical compensation layer. The liquid crystal cell, the first polarizer, the second polarizer, the laminate of the first optical compensation layer and the second optical compensation layer, and the laminate of the third optical compensation layer and the fourth optical compensation layer were attached through an acrylic pressure-sensitive adhesive (thickness of 20 μm), to thereby obtain a liquid crystal panel as shown in FIG. 1(b). A thickness direction retardation $Rth_2$ of the second optical compensation layer and a thickness direction retardation $Rth_4$ of the fourth optical compensation layer were respectively 120 nm. The difference between the sum $\Sigma Rth_{1-n}$ of the thickness direction retardation of all the optical compensation layers and the thickness direction retardation $Rth_c$ of the liquid crystal cell in the obtained liquid crystal panel was 50 nm. A liquid crystal display apparatus was fabricated by using the obtained liquid crystal panel and by employing conventional procedure. Contrast of the obtained liquid crystal display apparatus was measured. A contour map of the measurement results was shown in FIG. 5.

Example 4

Figure 6:
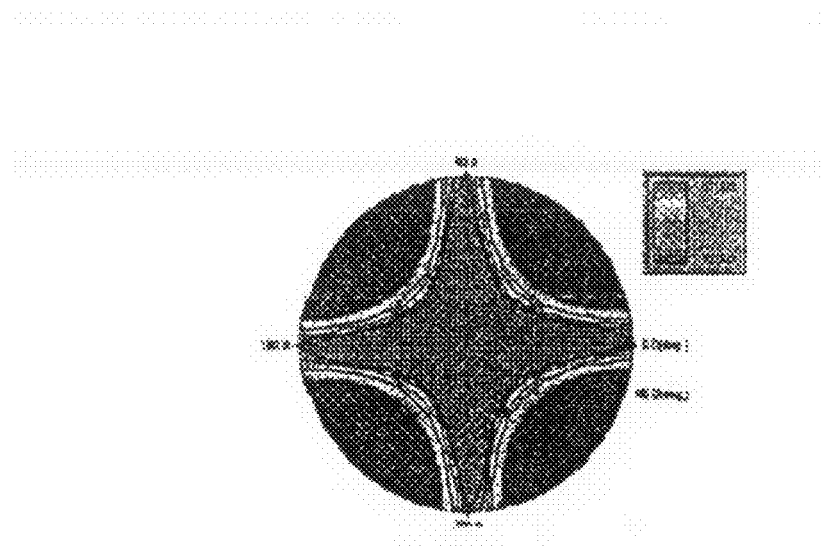
FIG. 6 A contour map showing a viewing angle dependence of contrast of a liquid crystal panel according to still another example of the present invention.

A liquid crystal panel was obtained in the same manner as Example 1 except that the thickness of the cholesteric alignment fixed layer in the second optical compensation layer was 4 μm. The obtained second optical compensation layer had a thickness direction retardation $Rth_2$ of 280 nm. The difference between the sum $\Sigma Rth_{1-n}$ of the thickness direction retardation of all the optical compensation layers and the thickness direction retardation $Rth_c$ of the liquid crystal cell in the obtained liquid crystal panel was 90 nm. A liquid crystal display apparatus was fabricated by using the obtained liquid crystal panel and by employing conventional procedure. Contrast of the obtained liquid crystal display apparatus was measured. A contour map of the measurement results was shown in FIG. 6.

Example 5

Figure 7:
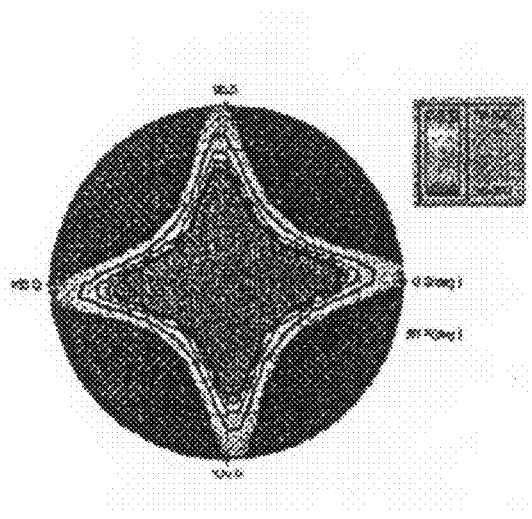
FIG. 7 A contour map showing a viewing angle dependence of contrast of a liquid crystal panel according to still another example of the present invention.

A fourth optical compensation layer (a laminate of a cholesteric alignment fixed layer and a plastic film layer) was produced in the same manner as the second optical compensation layer in Example 1. The liquid crystal cell, the first polarizer, the second polarizer, the first optical compensation layer, the second optical compensation layer, the third optical compensation layer and the fourth optical compensation layer were attached through an acrylic pressure-sensitive adhesive (thickness of 20 μm), to thereby obtain a liquid crystal panel as shown in FIG. 1(b). The difference between the sum $\Sigma Rth_{1-n}$ of the thickness direction retardation of all the optical compensation layers and the thickness direction retardation $Rth_c$ of the liquid crystal cell in the obtained liquid crystal panel was 130 nm. A liquid crystal display apparatus was fabricated by using the obtained liquid crystal panel and by employing conventional procedure. Contrast of the obtained liquid crystal display apparatus was measured. A contour map of the measurement results was shown in FIG. 7.

Comparative Example 1

Figure 8:
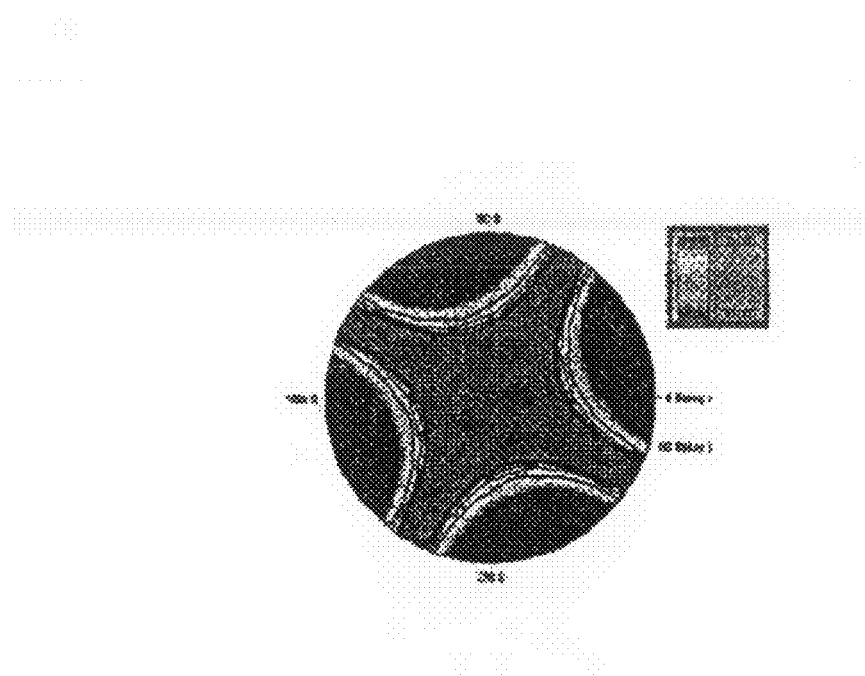
FIG. 8 A contour map showing a viewing angle dependence of contrast of a liquid crystal panel according to a comparative example.

A liquid crystal panel was obtained in the same manner as Example 5 except that a commercially available TAC film (manufactured by Fuji Photo Film CO., LTD.) was used in place of each of the second optical compensation layer and the fourth optical compensation layer. The sum of the thickness retardation of the TAC films were 80 nm and thus the difference between the sum $\Sigma Rth_{1-n}$ of the thickness direction retardation of all the optical films and the thickness direction retardation $Rth_c$ of the liquid crystal cell in the obtained liquid crystal panel was −110 nm. A liquid crystal display apparatus was fabricated by using the obtained liquid crystal panel and by employing conventional procedure. Contrast of the obtained liquid crystal display apparatus was measured. A contour map of the measurement results was shown in FIG. 8.

Comparative Example 2

Figure 9:
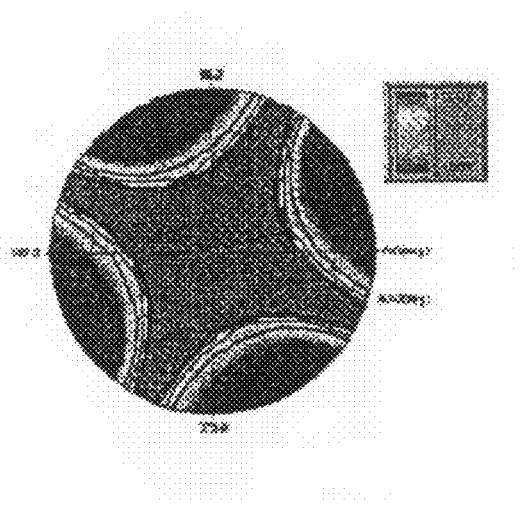
FIG. 9 A contour map showing a viewing angle dependence of contrast of a liquid crystal panel according to another comparative example.

A liquid crystal panel was obtained in the same manner as Comparative Example 1 except that two TAC films were arranged between the first optical compensation layer and the liquid crystal cell. The sum of the thickness retardation of the TAC films were 120 nm and thus the difference between the sum $\Sigma Rth_{1-n}$ of the thickness direction retardation of all the optical films and the thickness direction retardation $Rth_c$ of the liquid crystal cell in the obtained liquid crystal panel was −70 nm. A liquid crystal display apparatus was fabricated by using the obtained liquid crystal panel and by employing conventional procedure. Contrast of the obtained liquid crystal display apparatus was measured. A contour map of the measurement results was shown in FIG. 9.

Comparative Example 3

Figure 10:
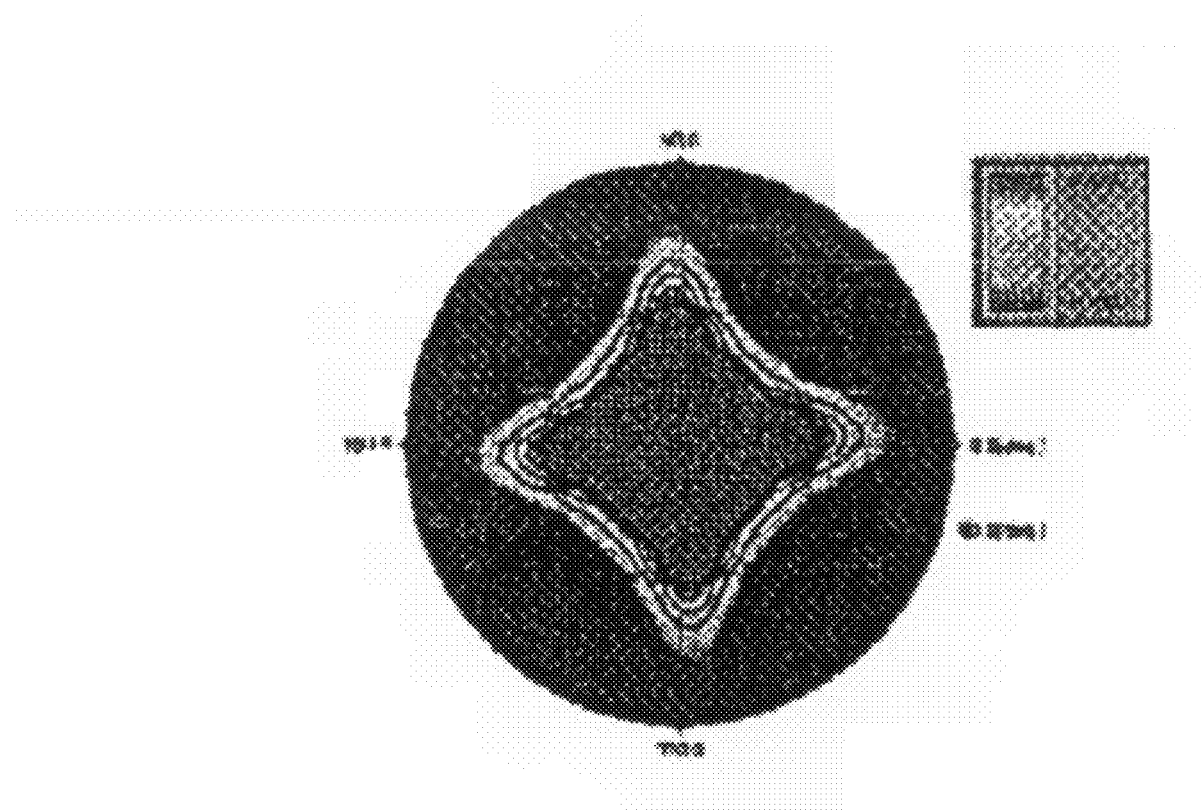
FIG. 10 A contour map showing a viewing angle dependence of contrast of a liquid crystal panel according to still another comparative example.

A liquid crystal panel was obtained in the same manner as Example 1 except that the thickness of the cholesteric alignment fixed layer in the second optical compensation layer was 5.4 μm. The obtained second optical compensation layer had a thickness direction retardation $Rth_2$ of 360 nm. The difference between the sum $\Sigma Rth_{1-n}$ of the thickness direction retardation of all the optical compensation layers and the thickness direction retardation $Rth_c$ of the liquid crystal cell in the obtained liquid crystal panel was 170 nm. A liquid crystal display apparatus was fabricated by using the obtained liquid crystal panel and by employing conventional procedure. Contrast of the obtained liquid crystal display apparatus was measured. A contour map of the measurement results was shown in FIG. 10.

As is apparent from FIGS. 3 to 10, the liquid crystal display apparatus using the liquid crystal panel of the present invention has excellent balance between contrast and viewing angle characteristics. More specifically, high contrast was obtained over a very wide range of viewing angle in Examples 1 and 2. Furthermore, high contrast was obtained in the frontal direction to thereby provide remarkably viewer-friendly characteristics in Examples 3 to 5. On the other hand, in Comparative Examples, the direction where high contrast is obtained was largely shifted from the frontal direction, and/or, high contrast can be obtained only in a very narrow range of viewing angle.

INDUSTRIAL APPLICABILITY

A liquid crystal panel according to the present invention may be used for any of a transmissive liquid crystal display apparatus, a reflective liquid crystal display apparatus and a semi-transmissive reflective liquid crystal display apparatus. A liquid crystal display apparatus according to the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave oven; in-car devices such as a back monitor, a car navigation system monitor, and a car audio; display devices such as a commercial information monitor; security devices such as a surveillance monitor; and nursing care and medical devices such as a nursing monitor and a medical monitor.

The invention claimed is:
1. A liquid crystal panel, comprising:
  a first polarizer;
  a first optical compensation layer containing a resin having an absolute value of photoelastic coefficient of $2 \times 10^{-11}$ m$^2$/N or less, and having a relationship of nx>ny=nz;
  a second optical compensation layer having a relationship of nx=ny>nz;
  a liquid crystal cell;

a third optical compensation layer containing a resin having an absolute value of photoelastic coefficient of $2\times10^{-11}$ m$^2$/N or less, and having a relationship of nx>ny=nz; and a second polarizer, in the stated order forward a viewer side, wherein the sum $\Sigma Rth_{1-n}$ of the thickness direction retardation of all the optical compensation layers and the thickness direction retardation $Rth_c$ of the liquid crystal cell satisfy the following expression (1):

$$-50 \text{ nm} < (\Sigma Rth_{1-n} - Rth_c) < 150 \text{ nm} \qquad (1).$$

2. A liquid crystal panel according to claim 1, further comprising a fourth optical compensation layer having a relationship of nx=ny>nz and being arranged between the liquid crystal cell and the third optical compensation layer.

3. A liquid crystal panel according to claim 1 or 2, wherein the second optical compensation layer is formed of a cholesteric alignment fixed layer having a selective reflection wavelength region of 350 nm or less.

4. A liquid crystal panel according to claim 3, wherein the second optical compensation layer has a thickness of 1 to 5 μm.

5. A liquid crystal panel according to claim 1 or 2, wherein the second optical compensation layer includes a layer formed of a film having a relationship of nx=ny>nz and containing a resin having an absolute value of photoelastic coefficient of $2\times10^{-11}$ m$^2$/N or less and a cholesteric alignment fixed layer having a selective reflection wavelength region of 350 nm or less.

6. A liquid crystal panel according to claim 5, wherein the second optical compensation layer has a thickness of 1 to 50 μm.

7. A liquid crystal panel according to any of claims 1 to 6, wherein the liquid crystal cell employs a VA mode.

8. A liquid crystal display apparatus comprising the liquid crystal panel according to any of claims 1 to 7.

* * * * *